(12) United States Patent
Okamoto et al.

(10) Patent No.: US 8,253,803 B2
(45) Date of Patent: Aug. 28, 2012

(54) VIDEO QUALITY ASSESSING APPARATUS

(75) Inventors: Jun Okamoto, Tokyo (JP); Takaaki Kurita, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 106 days.

(21) Appl. No.: 12/717,983

(22) Filed: Mar. 5, 2010

(65) Prior Publication Data

US 2010/0157144 A1 Jun. 24, 2010

Related U.S. Application Data

(62) Division of application No. 10/556,103, filed as application No. PCT/JP2004/011992 on Aug. 20, 2004, now Pat. No. 7,705,881.

(30) Foreign Application Priority Data

Aug. 22, 2003 (JP) ................................ 2003-298864
Feb. 12, 2004 (JP) ................................ 2004-035434

(51) Int. Cl.
*H04N 17/00* (2006.01)
*H04N 17/02* (2006.01)

(52) U.S. Cl. ......................... 348/180; 348/189; 348/192

(58) Field of Classification Search .......... 348/180–184, 348/189–190, 192–194, 518–519; 375/10, 375/142, 151, 368; 382/293–295, 279; *H04N 17/00, H04N 17/02*

See application file for complete search history.

(56) References Cited

U.S. PATENT DOCUMENTS

| | | |
|---|---|---|
| 5,446,492 A | 8/1995 | Wolf et al. |
| 5,550,937 A * | 8/1996 | Bell et al. ...................... 382/293 |
| 5,596,364 A * | 1/1997 | Wolf et al. .................... 348/192 |
| 6,259,477 B1 | 7/2001 | Hu |
| 6,295,083 B1 * | 9/2001 | Kuhn ............................ 348/190 |

(Continued)

FOREIGN PATENT DOCUMENTS

EP 0789497 A2 8/1997

(Continued)

OTHER PUBLICATIONS

Jun Okamoto, Takaaki Kurita, and Akira Takahashi, "A Method for Improving the Performance of Objective Video Quality Estimation", 2003 The Institute of Electronics, Information and Communication Engineers Sogo Taikai Koen Ronbunshu, Mar. 3, 2003, B-11-18 P600.

(Continued)

*Primary Examiner* — Trang U Tran
(74) *Attorney, Agent, or Firm* — Kilpatrick Townsend & Stockton LLP

(57) ABSTRACT

A subjective quality estimating part (11) receives an undeteriorated reference video signal (RI) and a deteriorated video signal (PI) produced from the reference video signal, calculates video signal feature values for both the signals, and according to a difference between the calculated video signal feature values of the signals, estimates a subjective quality of the deteriorated video signal. A feature value calculating part (12) calculates the video signal feature values of the reference video signal. A correction information storing part (13) stores correction information that corresponds to video signal feature values and is used to correct the subjective quality. A correction calculating part (14) receives the video signal feature values of the reference video signal from the feature value calculating part (12), retrieves correction information corresponding to the received video signal feature values from the correction information storing part (13), and transfers the retrieved correction information to a correcting part (15). According to the transferred correction information, the correcting part (15) corrects the subjective quality estimated by the subjective quality estimating part (11).

15 Claims, 15 Drawing Sheets

U.S. PATENT DOCUMENTS

| | | | |
|---|---|---|---|
| 6,483,538 B2 * | 11/2002 | Hu | 348/180 |
| 6,496,221 B1 | 12/2002 | Wolf et al. | |
| 6,704,451 B1 | 3/2004 | Hekstra et al. | |
| 7,133,066 B2 * | 11/2006 | Bourret | 348/180 |
| 2002/0181408 A1 | 12/2002 | Sirivara et al. | |
| 2003/0031368 A1 | 2/2003 | Myler et al. | |

FOREIGN PATENT DOCUMENTS

| | | |
|---|---|---|
| EP | 0967811 A2 | 12/1999 |
| JP | 08-205156 | 8/1996 |
| JP | 09-307930 | 11/1997 |
| JP | 2000-021496 | 1/2000 |
| JP | 2000-032496 | 1/2000 |
| JP | 2000-036971 | 2/2000 |
| JP | 2002-142131 | 5/2002 |
| JP | 2003-009186 | 1/2003 |
| JP | 2004-080177 | 3/2004 |
| WO | WO 99/45715 | 9/1999 |

OTHER PUBLICATIONS

Ansi T1.801.03-1996, "American National Standard for Telecommunications—Digital Transport of One-Way Video Signals—Parameters for Objective Performance Assessment", American National Standards Institute.

Shogo Muramatsu, Hitoshi Kiya and Masahiko Sagawa, "Scale Factor of Resolution Conversion Based on Orthogonal Transforms", IEICE Trans. Fundamentals, vol. E76-A, No. 7, pp. 1150-1153, Jul. 1993.

Shogo Muramatsu and Hitoshi Kiya, "Resolution Conversion Method with Arbitrary Rational Values for Transform-Coded Images," IEICE Trans. A vol. J77-A, No. 3, pp. 369-378, Mar. 1994.

Jun Okamoto, Noriko Yoshimura and Akira Takahashi, "A Study on Application of Objective Video Quality Measurement", IEICE Society conference, Sep. 1, 2002, B-11-14, p. 428.

Okamoto et al., "A Study on Objective Video Quality Measurement Method Considering Characteristics of Reference Video", NTT Service Integration Laboratories, NTT Corporation, The Institute of Electronics, Information and Communication Engineers, Aug. 28, 2003, vol. 103, No. 291, pp. 61-66.

Webster et al., "An Objectve Video Qualty Assessment Sysem Based on Human Perception", Proceedings of Spie, Spie, USA, vol. 1913, Jan. 1, 1993, pp. 15-26.

Office Action mailed Aug. 1, 2011, European Patent Application No. 04771953.9.

* cited by examiner

| VIDEO SIGNAL FEATURE VALUE | | CORRECTION COEFFICIENT | |
|---|---|---|---|
| SI | TI | $\alpha$ | $\beta$ |
| 50~100 | 0~25 | $\alpha 1$ | $\beta 1$ |
| 50~100 | 25~50 | $\alpha 2$ | $\beta 2$ |
| 100~150 | 0~25 | $\alpha 3$ | $\beta 3$ |
| 100~150 | 25~50 | $\alpha 4$ | $\beta 4$ |
| . | . | . | . |
| . | . | . | . |
| . | . | . | . |

FIG. 7

| CONDITION NO. | CONDITION ||| WEIGHTING FACTOR ||||
|---|---|---|---|---|---|---|---|
| | SIGNAL FORMAT | SIZE | ENCODING SYSTEM | α | β | γ | δ |
| 1 | A1 | B1 | C1 | 10 | 10 | 10 | 10 |
| 2 | A1 | B1 | C2 | 10 | 10 | 10 | 20 |
| 3 | A1 | B1 | C3 | 10 | 10 | 10 | 30 |
| 4 | A1 | B2 | C1 | 10 | 10 | 20 | 10 |
| 5 | A1 | B2 | C2 | 10 | 10 | 20 | 20 |
| 6 | A1 | B2 | C3 | 10 | 10 | 20 | 30 |
| 7 | A2 | B1 | C1 | 10 | 10 | 10 | 10 |
| 8 | A2 | B1 | C2 | 10 | 10 | 10 | 20 |
| 9 | A2 | B1 | C3 | 10 | 10 | 10 | 30 |
| 10 | A2 | B2 | C1 | 10 | 10 | 20 | 10 |
| 11 | A2 | B2 | C2 | 10 | 10 | 20 | 20 |
| 12 | A2 | B2 | C3 | 10 | 10 | 20 | 30 |
| ... | ... | ... | ... | ... | ... | ... | ... |

FIG. 8

| VIDEO SEQUENCE TITLE | DOCUMENT | LEARNING DATA | VERIFICATION DATA |
|---|---|---|---|
| REGION A (SI: LESS THAN AVERAGE, TI: GREATER THAN AVERAGE) | | | |
| FLASH PHOTOGRAPHY | Rec.1210-2 | O | |
| KNITTING | Rec.1210-2 | | O |
| CHEER-LEADERS | Rec.802-1 | O | |
| BICYCLES | Rec.802-1 | | O |
| FOOTBALL | Rec.802-1 | O | |
| EUROPEAN MARKET | Rec.1210-2 | | O |
| REGION B (SI: GREATER THAN AVERAGE, TI: LESS THAN AVERAGE) | | | |
| SOCCER ACTION | Rec.1210-2 | O | |
| MOBILE & CALENDAR | Rec.802-1 | | O |
| CHURCH | Rec.1210-2 | O | |
| HORSE RACE | Rec.1210-2 | | O |
| CROWDED CROSSWALK | Rec.1210-2 | O | |
| WHALE SHOW | Rec.1210-2 | | O |
| TABLE TENNIS | Rec.802-1 | O | |
| TODAY'S CATCH | Rec.1210-2 | | O |
| SUMMERTIME TRAINING | Rec.1210-2 | O | |
| REGION C (SI: LESS THAN AVERAGE, TI: GREATER THAN AVERAGE) | | | |
| AUTUMN LEAVES | Rec.802-1 | O | |
| SWINGING | Rec.1210-2 | | O |
| HORSE RIDING | Rec.802-1 | O | |
| SUSIE | Rec.802-1 | | O |
| FLAMINGOES | Rec.1210-2 | O | |
| WALK THROUGH THE SQUARE | Rec.1210-2 | | O |
| BUILDINGS ALONG THE CANAL | Rec.1210-2 | O | |
| BASEBALL | Rec.1210-2 | | O |
| ICE HOCKEY | Rec.1210-2 | O | |
| BOYS AND TOYS | Rec.1210-2 | | O |
| DRIVING | Rec.1210-2 | O | |
| WOMAN WITH BIRD CAGE | Rec.1210-2 | | O |
| FERRIS WHEEL | Rec.802-1 | | O |
| REGION D (SI: GREATER THAN AVERAGE, TI: LESS THAN AVERAGE) | | | |
| WEATHER REPORT | Rec.1210-2 | O | |
| YACHT HARBOR | Rec.1210-2 | | O |
| BIRCHES | Rec.802-1 | O | |
| MARCHING IN | Rec.1210-2 | | O |
| TEMPLATE | Rec.1210-2 | O | |
| JAPANESE ROOM | Rec.1210-2 | | O |
| GREEN LEAVES | Rec.1210-2 | O | |
| FLOWER GARDEN | Rec.802-1 | | O |
| | | 18 | 18 |

VIDEO QUALITY ASSESSING APPARATUS

CROSS REFERENCE TO RELATED APPLICATIONS

This application is a divisional patent application of U.S. patent application Ser. No. 10/556,103, filed on Nov. 14, 2005 which is based upon and claims the benefit of priority from PCT Application No. PCT/JP04/11992, filed on Aug. 20, 2004 and Japanese Patent Applications No. 2003-298864, filed on Aug. 22, 2003, and 2004-035434, filed on Feb. 12, 2004 in the Japanese Patent Office; all of which are incorporated herein by reference.

TECHNICAL FIELD

The present invention relates to a video quality assessing apparatus, a video quality assessing method, and a video quality assessing program that estimate a subjective quality of video images by measuring the physical feature values of a video signal without conducting a subjective quality assessing test in which a human tester actually watches the video images and assesses a quality thereof.

The present invention also relates to a video aligning apparatus, a video aligning method, and a video aligning program that work with the video quality assessing apparatus, video quality assessing method, and video quality assessing program and spatially and temporally align a deteriorated video signal with a reference video signal, the deteriorated video signal being produced by encoding or transmitting through, for example, a network the reference video signal.

BACKGROUND ART

Video information generally deteriorates its quality when subjected to some process such as encoding or transmitting through a network. The degree of deterioration of such deteriorated video information sensed by a person who actually watches the deteriorated video information is called a subjective quality.

A conventional method of assessing a subjective quality carries out a subjective quality assessing test in which a human tester actually watches video images. Assessing a quality of video images by actually watching the video images with human eyes is laborious and takes a long time. In addition, persons skilled in the quality assessment and novices frequently provide different assessment results.

To solve the problems, there is a method of estimating a subjective quality of video images according to physical measurements. This method finds a difference between the physical feature values of a reference video signal and a deteriorated video signal, or obtains a deterioration quantity only from the physical feature values of the deteriorated video signal, and objectively assess a degree of video quality deterioration according to the difference or the deterioration quantity.

A subjective video quality may be accurately estimated from limited video images. (For example, ANSI T1.801.03-1996, "Digital Transport of One-Way Video Signals Parameters for Objective Performance Assessment"; Okamoto and Takahashi, "Study on application of video quality objective assessment technique," IEICE society conference, September 2002; and Okamoto, Kurita, and Takahashi, "Study on improving the performance of video quality objective assessment," IEICE society conference, March 2003 can be referred to.) The quality of a given video image is greatly dependent on the characteristics of the video image, and therefore, video images having the same degree of deterioration may be assessed to have different subjective qualities.

Due to this, technical situations still exist that require subjective assessment tests to be conducted by human testers actually monitoring video images and assessing the quality thereof.

In these situations, there has been proposed an objective assessment method (PCT Pub. No. WO99/45715) that assesses a subjective quality like a human assessor does. The method focuses on an edge area of a video image, applies a Sobel filter to a video signal, and calculates a deterioration quantity of the video image.

Feature values employed by this method, however, are insufficient to provide an assessment accuracy comparable to that of a subjective assessment by human.

For a method of estimating a subjective video quality by comparing the physical feature values of reference and deteriorated video signals with each other, there is a precondition that spatial and temporal positions must be aligned between the reference and deteriorated video signals. Namely, between the reference and deteriorated video signals, temporal and spatial deviations must be cancelled if any.

To achieve the alignment, a manual aligning process has been carried out. To cope with this, a technique of automatically carrying out the aligning process has been proposed. For example, U.S. Pat. No. 5,446,492 carries out, as a preprocess of an objective assessment, a temporal aligning process to solve delays if any.

This technique can establish and continuously maintain a synchronized state for signals having the same size and the same frame rate such as TV broadcasting signals.

Recent video signals, however, have various sizes and aspect ratios, such as signals used for video distribution and communication services provided through IP networks including the Internet and received at terminals, e.g., personal computers (PCs). These services involve a risk of losing information pieces such as packets. It is difficult, therefore, to align spatial positions between a reference video signal and a deteriorated video signal. If IP packet arrival intervals vary or if packets are lost, video display timing will shift, fluctuate, or freeze. This sort of phenomena has not been present previously, and therefore, there is no technique to correct a temporal deviation between a reference video signal and a deteriorated video signal.

If spatial and temporal adjustments between a reference video signal and a deteriorated video signal are insufficient, the subjective quality estimating method will be unable to estimate a subjective quality of video images, or even if it is able to do so, the accuracy of the estimation will be poor.

The above-mentioned PCT Pub. No. WO99/45715 discloses, as a document showing an example of a temporal aligning process, ITU-T Contribution COM-12-29, "Draft new recommendation on multimedia communication delay, synchronization, and frame rate measurement," December 1997.

DISCLOSURE OF INVENTION

In consideration of the conventional techniques mentioned above, an object of the present invention is to provide a video quality assessing apparatus, a video quality assessing method, and a video quality assessing program, capable of accurately and invariably estimating a subjective quality of optional video images.

Another object of the present invention is to provide a video aligning apparatus, a video aligning method, and a video aligning program, capable of surely aligning the spatial and temporal positions of reference and deteriorated video signals when estimating a subjective video quality by comparing physical feature values of the reference and deteriorated video signals.

In order to accomplish the objects, a first aspect of the present invention provides a video quality assessing apparatus comprising a subjective quality estimating part to receive an undeteriorated reference video signal and a deteriorated video signal produced from the reference video signal, calculate video signal feature values for both the signals, and according to a difference between the calculated video signal feature values of the signals, estimate a subjective quality of the deteriorated video signal; a correction information storing part storing correction information that corresponds to video signal feature values and is used to correct the subjective quality; and a subjective quality correcting part to receive the video signal feature value of the reference video signal, retrieve correction information corresponding to the received video signal feature value from the correction information storing part, and correct the estimated subjective quality according to the retrieved correction information.

A second aspect of the present invention configures the first aspect such that the subjective quality estimating part estimates the subjective quality according to a difference of at least one of spatial information indicative of a video state in each frame and temporal information indicative of a frame-to-frame video change between the deteriorated video signal and the reference video signal.

A third aspect of the present invention configures the second aspect such that the subjective quality estimating part calculates, as the difference between the video signal feature values of the deteriorated and reference video signals, at least one of edge energy (E) indicative of a deterioration quantity in a video frame and moving energy (M) indicative of a deterioration quantity between video frames.

A fourth aspect of the present invention configures the second aspect such that the subjective quality estimating part estimates the subjective quality according to a difference of at least one of spatial information and temporal information stipulated in ITU-R Recommendation P.910 between the deteriorated video signal and the reference video signal.

A fifth aspect of the present invention configures the first aspect such that the correction information storing part stores, as the correction information to correct the subjective quality, correction coefficients in connection with spatial information indicative of a video state in each frame and temporal information indicative of a frame-to-frame video change.

A sixth aspect of the present invention configures the first aspect such that the subjective quality estimating part comprises an alignment information generating part to receive the reference video signal and deteriorated video signal and generate alignment information related to a temporal deviation between a reference video frame from the reference video signal and a deteriorated video frame from the deteriorated video signal and a spatial deviation between the reference and deteriorated video frames; a spatial feature value calculating part to eliminate the spatial and temporal deviations according to the alignment information and calculate spatial feature values of the reference and deteriorated video frames according to spatial information indicative of video states of the reference and deteriorated video frames; a temporal feature value calculating part to eliminate the spatial and temporal deviations according to the alignment information and calculate temporal feature values of the reference and deteriorated video frames according to temporal information indicative of frame-to-frame video changes of the reference and deteriorated video frames; and an estimating part to estimate the subjective quality of the deteriorated video signal according to the spatial and temporal feature values.

In order to accomplish the above-mentioned objects, a seventh aspect of the present invention provides a video quality assessing method achieved with a video quality assessing apparatus for estimating a subjective quality of a deteriorated video signal, the apparatus having a correction information storing part storing, in association with video signal feature values, correction information for correcting an estimated subjective quality of a deteriorated video signal produced from an undeteriorated reference video signal. The method comprises receiving the reference video signal and deteriorated video signal; calculating video signal feature values of both the signals; estimating a subjective quality of the deteriorated video signal according to a difference between the calculated video signal feature values of the signals; retrieving correction information corresponding to the calculated video signal feature values of the reference video signal; and correcting the estimated subjective quality according to the retrieved correction information.

In order to accomplish the above-mentioned objects, an eighth aspect of the present invention provides a video quality assessing program for functioning a computer as a subjective quality estimating means to receive an undeteriorated reference video signal and a deteriorated video signal produced from the reference video signal, calculate video signal feature values for both the signals, and according to a difference between the calculated video signal feature values of the signals, estimate a subjective quality of the deteriorated video signal; a correction information storing means to store correction information that corresponds to video signal feature values and is used to correct the subjective quality; and a subjective quality correcting means to retrieve correction information corresponding to the calculated video signal feature values of the reference video signal and correct the estimated subjective quality according to the retrieved correction information.

In order to accomplish the above-mentioned objects, a ninth aspect of the present invention provides a video quality assessing apparatus comprising an alignment information generating part to receive an undeteriorated reference video signal and a deteriorated video signal produced from the reference video signal and generate alignment information related to a temporal deviation between a reference video frame from the reference video signal and a deteriorated video frame from the deteriorated video signal and a spatial deviation between the reference and deteriorated video frames; a spatial feature value calculating part to eliminate the spatial and temporal deviations according to the alignment information and calculate spatial feature values of the reference and deteriorated video frames according to spatial information indicative of video states of the reference and deteriorated video frames; a temporal feature value calculating part to eliminate the spatial and temporal deviations according to the alignment information and calculate temporal feature values of the reference and deteriorated video frames according to temporal information indicative of frame-to-frame video changes of the reference and deteriorated video frames; and a subjective quality estimating part to estimate a subjective quality of the deteriorated video signal according to the spatial and temporal feature values.

A tenth aspect of the present invention configures the ninth aspect such that the apparatus further comprises a format converting part to convert a file format of deteriorated video images contained in the deteriorated video signal into a file format of reference video images contained in the reference video signal and output information related to the unified file format; and a correction coefficient storing part storing coefficients that correspond to file formats and are used to estimate a subjective quality of the deteriorated video signal, the subjective quality estimating part retrieving coefficients corresponding to the unified file format provided by the format converting part from the correction coefficient storing part and estimating a subjective quality of the deteriorated video signal according to the spatial feature values, temporal feature values, and retrieved coefficients.

An eleventh aspect of the present invention configures the tenth aspect such that the format converting part outputs, as the information related to the unified file format, at least one of a signal format of the deteriorated video signal, an information quantity of deteriorated video images sent with the deteriorated video signal, and an encoding system of the deteriorated video signal; and the correction coefficient storing part stores optimum coefficients corresponding to at least one of the signal format of the deteriorated video signal, the information quantity of deteriorated video images sent with the deteriorated video signal, and the encoding system of the deteriorated video signal.

A twelfth aspect of the present invention configures the ninth or tenth aspect such that the spatial feature value calculating part calculates, according to the reference and deteriorated video signals, an index that quantizes a deterioration occurring at an edge where brightness suddenly changes in a frame and provides the calculated value as the spatial feature value.

A thirteenth aspect of the present invention configures the twelfth aspect such that the spatial feature value calculating part calculates, according to the reference and deteriorated video signals, edge energy (Ave_EE) stipulated in ANSI T1.801.03-1995 as the spatial feature value.

A fourteenth aspect of the present invention configures the ninth, tenth, or twelfth aspect such that the spatial feature value calculating part calculates, as the spatial feature value, an index that quantizes a degree of occurrence of edges which appear in horizontal and vertical directions of the deteriorated video frame and at which brightness values thereof suddenly change in comparison with the reference video frame corresponding thereto.

A fifteenth aspect of the present invention configures the ninth, tenth, twelfth, or fourteenth aspect such that the temporal feature value calculating part calculates, as the temporal feature value, a frame-to-frame variation based on a difference between a temporal information value of a block of at least one pixel in a frame of the reference video signal and a temporal information value of a corresponding block in a corresponding frame of the deteriorated video signal, the temporal information values being those stipulated in ITU-R Recommendation P.910.

A sixteenth aspect of the present invention configures the ninth or tenth aspect such that the apparatus further comprises a correction information storing part storing correction information that corresponds to the spatial and temporal feature values and is used to correct the subjective quality; and a subjective quality correcting part to receive the spatial and temporal feature values of the reference video signal, retrieve correction information corresponding to the received spatial and temporal feature values from the correction information storing part, and correct the estimated subjective quality according to the retrieved correction information.

In order to accomplish the above-mentioned objects, a seventeenth aspect of the present invention provides a video quality assessing method comprising receiving an undeteriorated reference video signal and a deteriorated video signal produced from the reference video signal; generating alignment information related to a temporal deviation between a reference video frame from the reference video signal and a deteriorated video frame from the deteriorated video signal and a spatial deviation between the reference and deteriorated video frames; eliminating the spatial and temporal deviations according to the alignment information and calculating spatial feature values of the reference and deteriorated video frames according to spatial information indicative of video states of the reference and deteriorated video frames; eliminating the spatial and temporal deviations according to the alignment information and calculating temporal feature values of the reference and deteriorated video frames according to temporal information indicative of frame-to-frame video changes of the reference and deteriorated video frames; and estimating a subjective quality of the deteriorated video signal according to the spatial and temporal feature values.

In order to accomplish the above-mentioned objects, an eighteenth aspect of the present invention provides a video quality assessing method comprising receiving an undeteriorated reference video signal and a deteriorated video signal produced from the reference video signal; converting a file format of deteriorated video images contained in the deteriorated video signal into a file format of reference video images contained in the reference video signal; generating information related to the unified file format; generating alignment information related to a temporal deviation between a reference video frame from the reference video signal and a deteriorated video frame of a file-format-converted deteriorated video image from the deteriorated video signal and a spatial deviation between the reference and deteriorated video frames; eliminating the spatial and temporal deviations according to the alignment information and calculating spatial feature values of the reference and deteriorated video frames according to spatial information indicative of video states of the reference and deteriorated video frames; eliminating the spatial and temporal deviations according to the alignment information and calculating temporal feature values of the reference and deteriorated video frames according to temporal information indicative of frame-to-frame video changes of the reference and deteriorated video frames; and estimating a subjective quality of the deteriorated video signal according to the spatial feature values, the temporal feature values, and coefficients corresponding to the information related to the unified file format.

In order to accomplish the above-mentioned objects, a nineteenth aspect of the present invention provides a video quality assessing program for functioning a computer as an alignment information generating means to receive an undeteriorated reference video signal and a deteriorated video signal produced from the reference video signal and generate alignment information related to a temporal deviation between a reference video frame from the reference video signal and a deteriorated video frame from the deteriorated video signal and a spatial deviation between the reference and deteriorated video frames; a spatial feature value calculating means to eliminate the spatial and temporal deviations according to the alignment information and calculate spatial feature values of the reference and deteriorated video frames according to spatial information indicative of video states of the reference and deteriorated video frames; a temporal feature value calculating means to eliminate the spatial and temporal deviations according to the alignment information and calculate temporal feature values of the reference and deteriorated video frames according to temporal information indicative of frame-to-frame video changes of the reference and deteriorated video frames; and a subjective quality estimating means to estimate a subjective quality of the deteriorated video signal according to the spatial and temporal feature values.

A twentieth aspect of the present invention configures the nineteenth aspect such that the program further functions the computer as a format converting means to convert a file format of deteriorated video images contained in the deteriorated video signal into a file format of reference video images contained in the reference video signal and output information related to the unified file format; and a correction coefficient storing means to store coefficients that correspond to file formats and are used to estimate a subjective quality of the deteriorated video signal, the subjective quality estimating means retrieving coefficients corresponding to the unified file format provided by the format converting means from the correction coefficient storing means and estimating a subjective quality of the deteriorated video signal according to the spatial feature values, temporal feature values, and retrieved coefficients.

In order to accomplish the above-mentioned objects, a twenty-first aspect of the present invention provides a video aligning apparatus comprising a format converting part to receive an undeteriorated reference video signal and a deteriorated video signal produced from the reference video signal and convert a file format of deteriorated video images contained in the deteriorated video signal into a file format of reference video images contained in the reference video signal; a display timing aligning part to equalize the number and display timing of video frames between the reference and deteriorated video signals; and a synchronizing/position-aligning part to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences.

A twenty-second aspect of the present invention configures the twenty-first aspect such that the format converting part converts at least one of the data format, size, and aspect ratio of the deteriorated video signal into those of the reference video signal.

A twenty-third aspect of the present invention configures the twenty-first aspect such that, if the reference and deteriorated video frames have different frame rates, the display timing aligning part interpolates or reduces the deteriorated video frames to equalize the frame rates of the reference and deteriorated video frames with each other.

A twenty-fourth aspect of the present invention configures the twenty-first aspect such that the display timing aligning part adjusts the display timing of the deteriorated video frames to that of the reference video frames.

A twenty-fifth aspect of the present invention configures the twenty-first aspect such that, if the display timing of the reference video frames is irregular, the display timing aligning part adjusts the display timing of the reference and deteriorated video frames to a predetermined time interval.

A twenty-sixth aspect of the present invention configures the twenty-first aspect such that the synchronizing/position-aligning part carries out a macroscopic synchronizing process on the target frames and several front and rear frames thereof of the reference and deteriorated video signals, to compare changes in feature values of the frames or of specific areas in the frames with one another and determine a temporal correspondence that minimizes a feature value difference between the reference and deteriorated video frames.

A twenty-seventh aspect of the present invention configures the twenty-sixth aspect such that the synchronizing/position-aligning part carries out a microscopic synchronizing/position-aligning process on the target frames and several front and rear frames thereof of the reference and deteriorated video signals, to shift temporal and pixel correspondences between the target and deteriorated video frames, compare feature values of the frames or of specific areas in the frames with one another, and determine temporal and pixel correspondences that minimize a feature value difference between the reference and deteriorated video frames.

A twenty-eighth aspect of the present invention configures the twenty-seventh aspect such that the synchronizing/position-aligning part initially carries out the macroscopic synchronizing process and microscopic synchronizing/position-aligning process.

A twenty-ninth aspect of the present invention configures the twenty-eighth aspect such that, if the deteriorated video frames are in a frozen state, the synchronizing/position-aligning part counts the number of the frames to measure a duration of the frozen state.

A thirtieth aspect of the present invention configures the twenty-ninth aspect such that the synchronizing/position-aligning part finds feature values of the target frames and several front and rear frames thereof of the reference and deteriorated video signals, and if the feature values of the reference video frames temporally change while the feature values of the deteriorated video frames are temporally unchanged, determines that the deteriorated video frames are in a frozen state.

A thirty-first aspect of the present invention configures the twenty-eighth aspect such that, if the deteriorated video frames are in a frozen state or if they are hardly synchronized with the reference video frames, the synchronizing/position-aligning part again caries out the macroscopic synchronizing process.

A thirty-second aspect of the present invention configures the twenty-eighth aspect such that, if the deteriorated video frames are in a frame misaligned state, the synchronizing/position-aligning part outputs the number of misaligned frames.

A thirty-third aspect of the present invention configures the twenty-first aspect such that the apparatus further comprises a brightness/color correcting part to receive the reference video signal and deteriorated video signal from the synchronizing/position-aligning part, adjust brightness and color information of the deteriorated video signal to that of the reference video signal, and return the brightness-and-color-information-adjusted deteriorated video signal to the synchronizing/position-aligning part.

In order to accomplish the above-mentioned objects, a thirty-fourth aspect of the present invention provides a video aligning method comprising receiving an undeteriorated reference video signal and a deteriorated video signal produced from the reference video signal; converting a file format of deteriorated video images contained in the deteriorated video signal into a file format of reference video images contained in the reference video signal; equalizing the number and display timing of video frames between the reference and deteriorated video signals; and monitoring target frames of the reference and deteriorated video signals and several front and rear frames thereof for a misalignment between the reference and deteriorated video frames and a frozen state of the deteriorated video frames and adjusting frame-to-frame and pixel-to-pixel correspondences.

In order to accomplish the above-mentioned objects, a thirty-fifth aspect of the present invention provides a video quality assessing program for functioning a computer as a format converting means to receive an undeteriorated reference video signal and a deteriorated video signal produced from the reference video signal and convert a file format of deteriorated video images contained in the deteriorated video signal into a file format of reference video images contained in the reference video signal; a display timing aligning means to equalize the number and display timing of video frames between the reference and deteriorated video signals; and a synchronizing/position-aligning means to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences.

In order to accomplish the above-mentioned objects, a thirty-sixth aspect of the present invention provides a video quality assessing apparatus comprising a format converting part to receive an undeteriorated reference video signal and a deteriorated video signal produced from the reference video signal and convert a file format of deteriorated video images contained in the deteriorated video signal into a file format of reference video images contained in the reference video signal; a display timing aligning part to equalize the number and display timing of video frames between the reference and deteriorated video signals; a synchronizing/position-aligning part to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences; and a subjective quality estimating part to receive the reference video signal and deteriorated video signal aligned by the synchronizing/position-aligning part, calculate video signal feature values for both the signals, and according to a difference between the calculated video signal feature values of the signals, estimate a subjective quality of the deteriorated video signal.

BRIEF DESCRIPTION OF DRAWINGS

FIG. 7 is a view showing conditions and corresponding weighting factors stored in a weighting factor database of FIG. 6;

FIG. 8 is a view showing a list of standard video data classified into learning data and verification data used by the embodiments of the present invention;

BEST MODE FOR CARRYING OUT THE INVENTION

Video quality assessing apparatuses, video quality assessing methods, video quality assessing programs, video aligning apparatuses, video aligning methods, and video aligning programs according to embodiments of the present invention will be explained in detail. The first to third embodiments of the present invention relate to the video quality assessing apparatuses, video quality assessing methods, and video quality assessing programs. The fourth embodiment of the present invention relates to the video aligning apparatus, video aligning method, and video aligning program.

First Embodiment

Figures 1, 2:
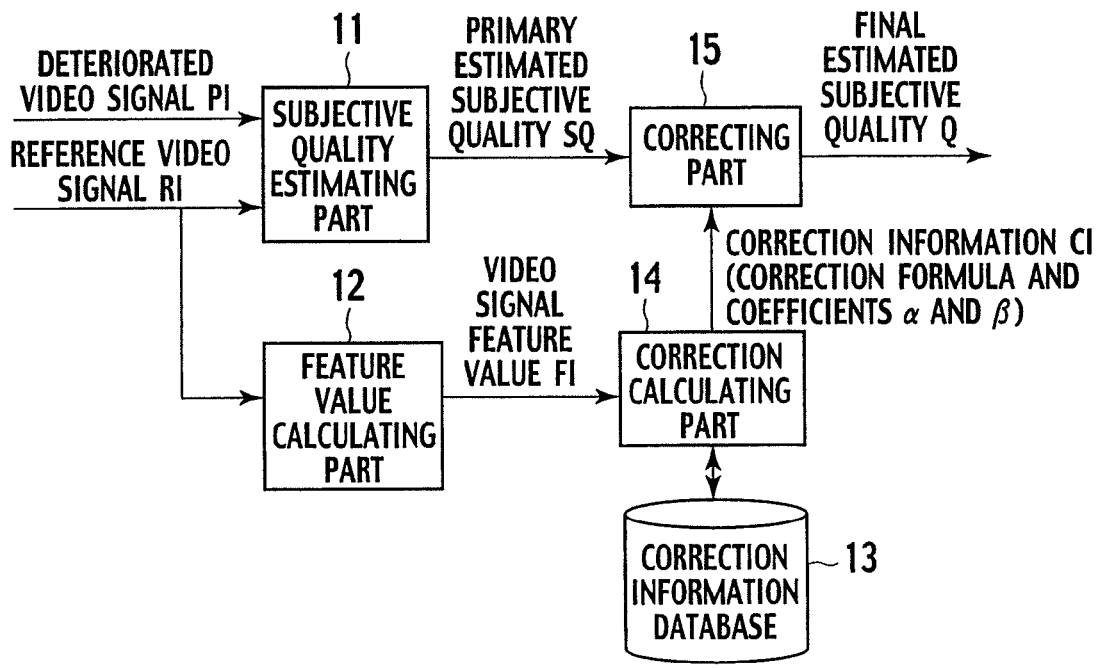
FIG. 1 is a block diagram showing a video quality assessing apparatus according to a first embodiment of the present invention.
FIG. 2 is a view showing correction information stored in a correction information database of FIG. 1.

The video quality assessing apparatus according to the first embodiment of the present invention will be explained with reference to FIG. 1. FIG. 1 is a block diagram showing the video quality assessing apparatus according to the first embodiment of the present invention.

The video quality assessing apparatus of the first embodiment at least includes a subjective quality estimating part 11, a feature value calculating part 12, a correction information database 13, a correction calculating part 14, and a correcting part 15.

The subjective quality estimating part 11 receives an undeteriorated reference video signal RI and a deteriorated video signal PI. The deteriorated video signal PI is produced from the reference video signal RI through, for example, encoding or network transmission.

For the reference video signal RI and deteriorated video signal PI, the subjective quality estimating part 11 calculates a difference between physical feature values of the signals. The video signal feature values include, for example, spatial information (SI) indicative of a video state of a given frame contained in the video signal and temporal information (TI) indicative of a frame-to-frame video change contained in the video signal. The spatial information SI and temporal information TI are stipulated in, for example, ITU-R Recommendation P.910, "Subjective Video Quality Assessment Methods for Multimedia Applications," Appendix A.

According to the calculated difference between the video signal feature values, the subjective quality estimating part 11 quantizes a deterioration of the deteriorated video signal PI and estimates a subjective quality thereof according to the quantized deterioration. Namely, the subjective quality estimating part 11 quantizes a deterioration of the deteriorated video signal PI according to the reference video signal RI and deteriorated video signal PI and estimates a subjective quality according to the quantized deterioration. The subjective quality estimating part 11 outputs the estimated subjective quality as a primary estimated subjective quality SQ. The primary estimated subjective quality SQ is determined by, for example, edge energy (E) and moving energy (M) as follows:

$$SQ = F(M, E) \quad (1)$$

The function F is beforehand obtained through subjective assessment tests. The edge energy (E) and moving energy (M) are stipulated in ANSI T1.801.03-1996, "Digital Transport of One-Way Video Signals Parameters for Objective Performance Assessment."

The feature value calculating part 12 receives the reference video signal RI and calculates a video signal feature value FI according to the reference video signal RI. The video signal feature value FI may be the above-mentioned spatial information SI or temporal information TI. The feature value calculating part 12 specifies at least one of the spatial information SI and temporal information TI and quantizes the information as a feature value.

The correction information database 13 stores correction information corresponding to video signal feature values. The video signal feature value is, for example, the above-mentioned spatial information SI or temporal information TI. The correction information includes correction formulas and correction coefficients used to correct the primary estimated subjective quality SQ output from the subjective quality estimating part 11. The correction information will be explained later in detail with reference to FIG. 2. The correction formulas and correction coefficients are determined in advance through tests and are stored in the correction information database 13. Watching a video image having a video signal feature value FI, a human tester may sense a deterioration, if any. Characteristics indicative of such a subjectively sensed deterioration are calculated through subjective assessment tests in advance. The characteristics are used to prepare correction formulas and correction coefficients corresponding to video signal feature values FI.

The physical feature values of reference video signals and the subjective assessment characteristics of deteriorated video signals produced from the reference video signals are beforehand measured through subjective assessment tests. Based on one of the measured correspondences derived from the video signal feature values of the reference video signal RI, the primary estimated subjective quality SQ provide by the subjective quality estimating part 11 is corrected to provide an accurate subjective assessment value.

The correction calculating part 14 receives the video signal feature value FI from the feature value calculating part 12 and extracts a correction formula and correction coefficients corresponding to the video signal feature value FI from the correction information database 13. Namely, the correction calculating part 14 retrieves the correction formula and correction coefficients corresponding to the video signal feature value FI from the correction information database 13, and thereafter, outputs the correction formula and correction coefficients as correction information CI.

The correcting part 15 receives the primary estimated subjective quality SQ from the subjective quality estimating part 11 and the correction information CI from the correction calculating part 14. The correcting part 15 substitutes the primary estimated subjective quality SQ for the correction formula and correction coefficients contained in the correction information CI and outputs the corrected primary estimated subjective quality SQ as a final estimated subjective quality Q. The final estimated subjective quality Q is a correction of the primary estimated subjective quality SQ that is a quantized subjective quality of the deteriorated video signal PI.

Next, the correction information corresponding to video signal feature values and stored in the correction information database 13 will be explained with reference to FIG. 2. FIG. 2 is a view showing the correction information stored in the correction information database 13 of FIG. 1.

In FIG. 2, the correction information database 13 stores correction coefficients corresponding to video signal feature values, respectively. The feature value calculating part 12 calculates video signal feature values (spatial information SI and temporal information TI) of the reference video signal RI as, for example, (SI, TI)=(75, 30). In this case, correction coefficients corresponding to the video signal feature values are $(\alpha, \beta) = (\alpha 2, \beta 2)$. In practice, the correction calculating part 14 receives a video signal feature value FI from the feature value calculating part 12 and retrieves a correction formula and correction coefficients corresponding to the video signal feature value FI from the correction information database 13. The correction formula may vary depending on a video signal feature value. In this case, the correction information database 13 stores not only correction coefficients but also formulas corresponding to video signal feature values.

Figure 3:
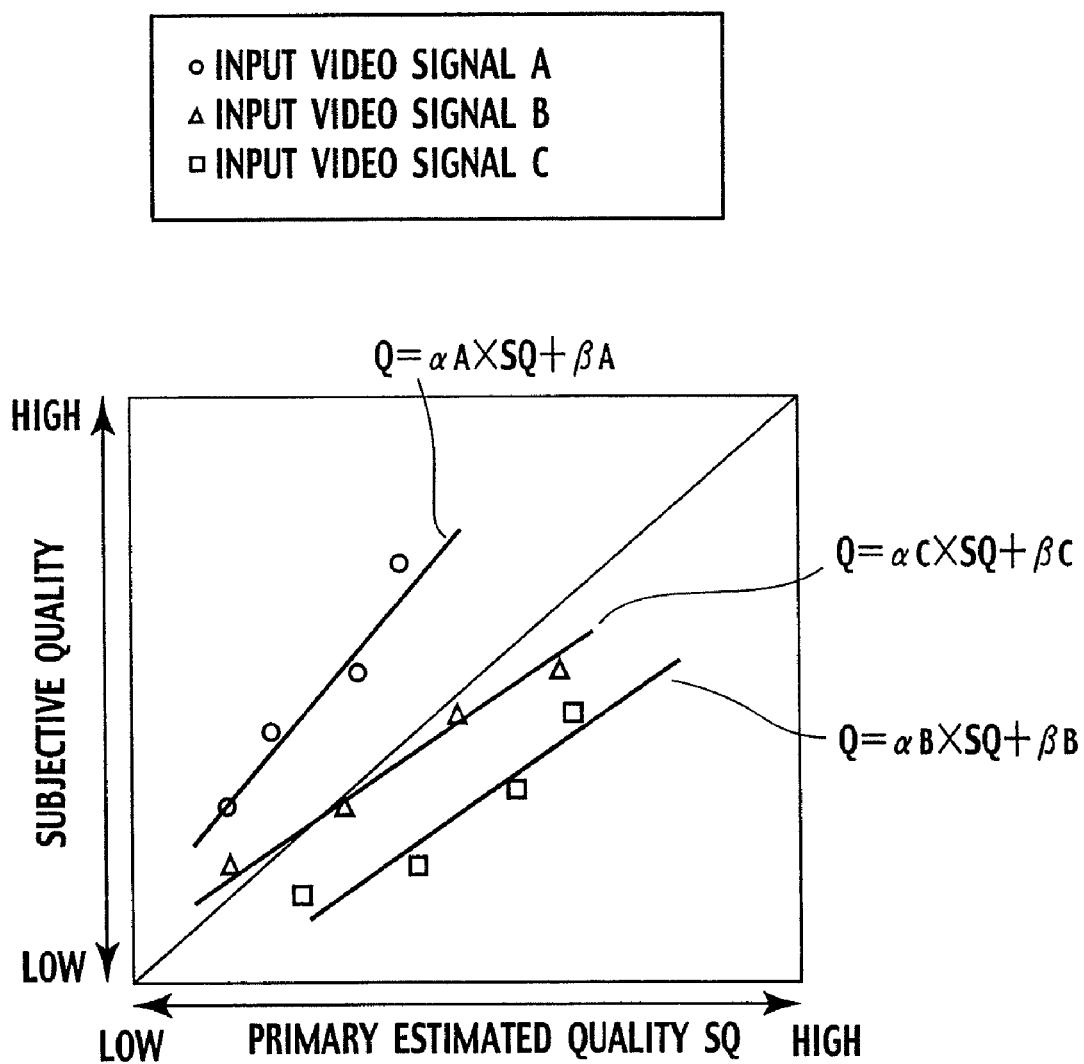
FIG. 3 is a view showing relationships between final estimated subjective quality Q corrected from primary estimated subjective quality SQ according to correction formulas and measured subjective quality.

The final estimated subjective quality Q provided from the correcting part 15 by correcting the primary estimated subjective quality SQ will be explained with reference to FIG. 3. FIG. 3 shows relationships among the primary estimated subjective quality SQ, corrected final estimated subjective quality Q, and measured subjective quality.

According to the first embodiment, the correction formula is as follows:

$$\text{Final estimated subjective quality } Q = \alpha \times \text{primary estimated subjective quality } SQ + \beta \quad (2)$$

where $\alpha$ and $\beta$ are correction coefficients. FIG. 3 shows three correction formulas prepared for three kinds of input video signals supplied to the video quality assessing apparatus. An abscissa represents primary estimated subjective qualities SQ output from the subjective quality estimating part 11, and an ordinate represents subjective qualities provided by subjective quality assessing tests carried out by human testers who actually watch video images produced from input video signals. In FIG. 3, circular, square, and triangular marks represent subjective quality assessing points of the input video signals. Three segments represent correction formulas according to the embodiment corresponding to the three input video signals. According to the embodiment, the primary estimated subjective quality SQ is corrected with the use of a correction formula selected for the input video signal.

In this way, the first embodiment finds the physical feature values and human visual characteristics of reference video signals, stores the human visual characteristics as correction information corresponding to the feature values of the reference video signals in a database, estimates a subjective quality of a deteriorated video signal according to a difference between the physical feature values of the deteriorated video signal and those of a corresponding reference video signal, weights the estimated subjective quality with the correction information, and provides an estimated subjective quality whose accuracy is comparable to that provided by the conventional subjective assessing method.

According to the embodiment, an arrangement to calculate video signal feature values of a reference video signal RI is the feature value calculating part 12 that is a logically discrete part. It is possible not to separately prepare the feature value calculating part 12. The subjective quality estimating part 11 may provide the video signal feature values of the reference video signal RI.

The correction calculating part 14 and correcting part 15 may be physically and logically integrated into one. Namely, the correcting part 15 may directly receive the video signal feature values of the reference video signal RI and retrieve correction information corresponding to the video signal feature values from the correction information database.

Second Embodiment

Figure 4:
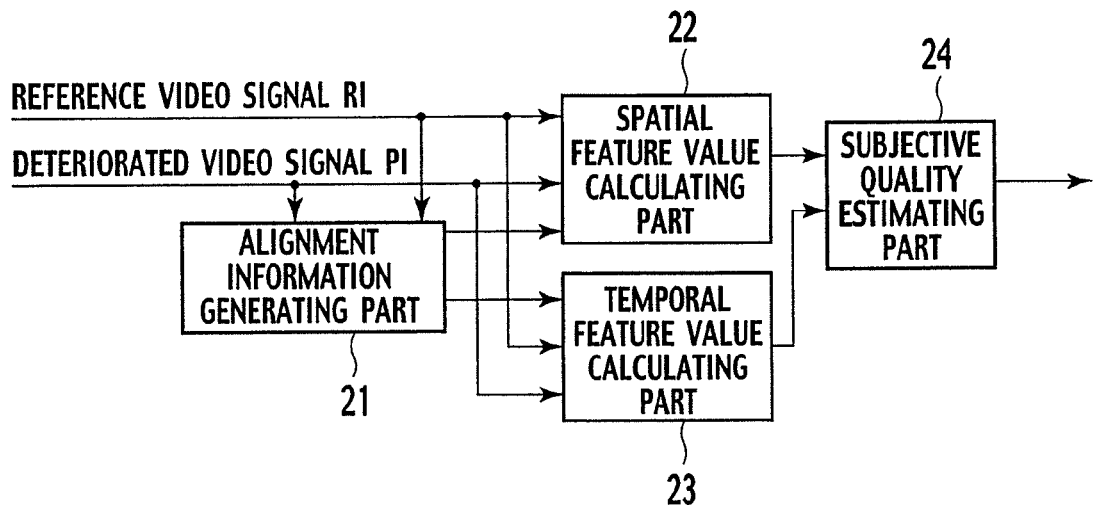
FIG. 4 is a block diagram showing a video quality assessing apparatus according to a second embodiment of the present invention.

Components of a video quality assessing apparatus according to the second embodiment of the present invention will be explained with reference to FIG. 4. FIG. 4 is a block diagram showing an arrangement of the video quality assessing apparatus according to the second embodiment of the present invention.

In FIG. 4, the video quality assessing apparatus according to the second embodiment has an alignment information generating part 21, a spatial feature value calculating part 22, a temporal feature value calculating part 23, and a subjective quality estimating part 24.

The alignment information generating part 21 receives a reference video signal RI and a deteriorated video signal PI, extracts reference video frames from the reference video signal RI and deteriorated video frames from the deteriorated video signal PI, detects temporal and spatial deviations between the reference and deteriorated video frames, and generates alignment information concerning the temporal and spatial deviations.

A temporal deviation between reference and deteriorated video frames means a temporal misalignment between the reference and deteriorated video frames received at given time by the alignment information generating part 21. For example, the alignment information generating part 21 receives a reference video frame A, and at the same time, a deteriorated video frame that corresponds to a reference video frame three frames before the reference video frame A. In this case, the alignment information generating part 21 detects that the deteriorated video frame is delayed by three frames behind the reference video frame and generates alignment information accordingly.

A spatial deviation between reference and deteriorated video frames means a spatial positional difference between video images in the reference and deteriorated video frames received at given time by the alignment information generating part 21. For example, the alignment information generating part 21 receives, at given timing, reference and deteriorated video frames showing a ball and having no temporal deviation between them. Among the received video frames, the reference video frame shows the ball at the center thereof while the deteriorated video frame shows the ball at a location displaced from the center of the frame by one pixel rightward and two pixels upward. In this case, the alignment information generating part 21 detects that the deteriorated video frame is deviated from the reference video frame by one pixel rightward and two pixels upward and generates alignment information accordingly.

The spatial feature value calculating part 22 receives the reference video signal RI, deteriorated video signal PI, and alignment information, eliminates the spatial and temporal deviations between the reference and deteriorated video frames, and calculates spatial feature values according to the reference video signal RI and deteriorated video signal PI. According to the second embodiment, the spatial feature values include edge energy (Ave_EE) and a minimum horizontal/vertical edge quantity (Min_HV).

Edge Energy (Ave_EE)

This index quantizes, according to the reference video signal RI and deteriorated video signal PI, a deterioration (such as the degree of blurring) of an edge where brightness suddenly changes in a frame. The second embodiment employs a Sobel filter to enhance an edge according to pixel brightness values and quantize a deterioration of the edge. The edge energy (Ave_EE) to be quantized is stipulated in ANSI T1.801.03-1996, "Digital Transport of One-Way Video Signals Parameters for Objective Performance Assessment."

The edge energy (Ave_EE) is quantized as follows:

$$\text{Ave\_EE} = \sqrt{\frac{1}{M}\sum_{m=0}^{M-1}\left(\frac{SI_{in}(m) - SI_{out}(m)}{SI_{in}(m)}\right)^2} \quad (3)$$

where $SI_\mu(m)$ ($\mu$=in or out) is given as follows:

$$SI_\mu(m) = \sqrt{\frac{1}{N}\sum_{i,j}\{SI_{h\_\mu}^2(i,j,m) + SI_{v\_\mu}^2(i,j,m)\}} - \left(\frac{1}{N}\sqrt{SI_{h\_\mu}^2(i,j,m) + SI_{v\_\mu}^2(i,j,m)}\right)^2 \quad (4)$$

$\mu$ = in or out where $SI_{h\_\mu}(i, j, m)$ and $SI_{v\_\mu}(i, j, m)$ are Sobel filters at a position (i, j) in an "m"th frame and are given as follows:

$$SI_{h,\mu}(i, j, m) = \quad (5)$$
$$\{-Y_\mu(i-1, j-1, m) - 2Y_\mu(i, j-1, m) - Y_\mu(i+1, j-1, m) +$$
$$Y_\mu(i-1, j+1, m) + 2Y_\mu(i, j+1, m) + Y_\mu(i+1, j+1, m)\}$$

$$SI_{v,\mu}(i, j, m) = \quad (6)$$
$$\{-Y_\mu(i-1, j-1, m) + Y_\mu(i+1, j-1, m) - 2Y_\mu(i-1, j, m) +$$
$$2Y_\mu(i+1, j, m) - Y_\mu(i-1, j+1, m) + Y_\mu(i+1, j+1, m)\}$$

where $Y_{in}(i, j, m)$ is a brightness value (from 0 to 255) of a pixel at a position (i, j) in an "m"th reference video frame, and $Y_{out}(i, j, m)$ is a brightness value (from 0 to 255) of a pixel at a position (i, j) in an "m"th deteriorated video frame.

A result of estimation based on only the edge energy (Ave_EE) will be explained later with reference to the drawings. There are video images on which subjective assessment values greatly vary although substantially no change is observed in objective assessment values. For such video images, the edge energy (Ave_EE) is insufficient to grasp a video deterioration.

Minimum Horizontal/Vertical Edge Quantity (Min_HV)

This index is obtained by quantizing a degree of occurrence of edges which appear in horizontal and vertical directions of a deteriorated video frame and at which brightness values thereof suddenly change in comparison with a reference video frame corresponding thereto. The feature value (Min_HV) employed by the second embodiment represents the ratio of horizontal/vertical edges occurring in horizontal and vertical directions in a frame to other edges occurring in the remaining zones in the frame. The feature value (Min_HV) represents a distortion quantity, and the second embodiment employs this value to quantize the degree of occurrence of edges in horizontal and vertical directions. This value is calculated in each of the reference and deteriorated video signals according to the ratio of an edge quantity (HV) in horizontal and vertical zones determined by constants r0=20 and Δθ=0.05236 shown in FIG. 5 to an edge quantity (HV bar) in the remaining zones. The reason why this index is employed is to correctly consider block distortions caused when encoding video information block by block.

The minimum horizontal/vertical edge quantity (Min_HV) is quantized as follows:

$$\text{Min\_HV} = \min_m \left\{ \frac{HVR_{in}(m) - HVR_{out}(m)}{HVR_{in}(m)} \right\} \quad (7)$$

where $HVR_\mu(m)$ ($\mu$=in or out) is given as follows:

$$HVR_\mu(m) = \frac{HV_\mu(r_{min}, \Delta\theta, m) + 0.5}{\overline{HV_\mu}(r_{min}, \Delta\theta, m) + 0.5} \quad (8)$$

$\mu$ = in or out

There is the following definition:

$$HV_\mu(r_{min}, \Delta\theta, m) = \frac{1}{P} \sum_{i,j} SI_{r\_\mu}(i, j, m) \quad (9)$$

Figure 5:
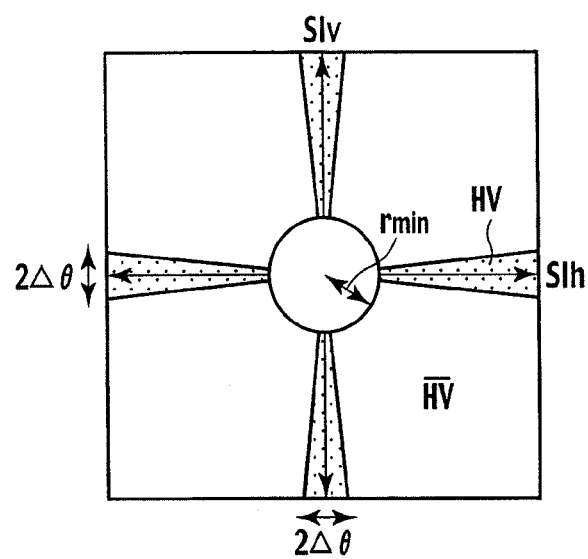
FIG. 5 is a view showing a calculation of horizontal and vertical edge quantities by a spatial feature value calculating part of FIG. 4.

$\mu$ = in or out in which the following conditions must be satisfied:

$$SI_{r\_\mu}(i,j,m) \geq r_{min} > 0 \quad (10)$$

$$k_\Pi/2 - \Delta\theta < SI_{\theta\_\mu}(i,j,m) < k_\Pi/2 + \Delta\theta \ (k=0,1,2,3) \quad (11)$$

where $SI_{\theta\_\mu}(i, j, m) = \tan^{-1}[SI_{v\_\mu}(i, j, m)/SI_{h\_\mu}(i, j, m)]$ P in the expression (9) is the number of pixels in the shaded zones in FIG. 5.

There is the following definition:

$$\overline{HV_\mu}(r_{min}, \Delta\theta, m) = \frac{1}{P} \sum_{i,j} SI_{r\_\mu}(i, j, m) \quad (12)$$

$\mu$ = in or out in which the following conditions must be satisfied:

$$SI_{r\_\mu}(i,j,m) \geq r_{min} > 0 \quad (13)$$

$$k_\Pi/2 + \Delta\theta < SI_{\theta\_\mu}(i,j,m) < (k+1)_\Pi/2 - \Delta\theta \ (k=0,1,2,3) \quad (14)$$

P in the expression (12) is the number of pixels in a range that satisfies the expressions (13) and (14).

The minimum horizontal/vertical edge quantity (Min_HV) indicates a deterioration that is not caught with the edge energy (Ave_EE). More precisely, it is a feature value to catch edges newly produced due to block distortion. With this index, such a deterioration can be correctly caught as explained later with reference to the drawings. This index is based on ANSI standards. However, the index has been originally developed with the use of a minimum value to sensitively catch only edges newly generated.

The temporal feature value calculating part 23 receives the reference video signal RI, deteriorated video signal PI, and alignment information, eliminates the spatial and temporal deviations between the reference and deteriorated video frames, and calculates temporal feature values according to the reference video signal RI and deteriorated video signal PI. According to the second embodiment, the temporal feature value is average moving energy of blocks (Ave_MEB) that is an index based on a difference between TI (temporal information) values to be explained later. The TI value represents a pixel brightness difference between video frames and is stipulated in ITU-R Recommendation P.910.

Average Moving Energy of Blocks (Ave_MEB)

This index is obtained by finding a difference between TI values of blocks defined in reference and deteriorated video frames, each block consisting of several pixels. The difference is normalized with a TI value of the block in the reference video frame, to provide the index.

Namely, the average moving energy of blocks (Ave_MEB) is expressed as follows:

$$\text{Ave\_MEB} = \frac{1}{M} \sum_{m=0}^{M-1} \frac{1}{N_b} \sqrt{\sum_{(k,l)} \left( \frac{TI_{b\_in}(k, l, m) - TI_{b\_out}(k, l, m)}{TI_{b\_in}(k, l, m)} \right)^2} \quad (15)$$

where $TI_{b\_\mu}(k, l, m)$ is expressed as follows:

$$TI_{b\_\mu}(k, l, m) = \quad (16)$$
$$\frac{1}{64} \sum_{(i,j)} (Y_\mu(8k+i, 8l+j, m) - Y_\mu(8k+i, 8l+j, m-1))^2$$

$\mu$ = in or out

The average moving energy of blocks (Ave_MEB) is a feature value that is capable of catching a motional deterioration occurring in a block area. Such a deterioration is unable to catch with the edge energy (Ave_EE). The index Ave_MEB can sensitively catch the motional block deterioration as will be explained later. The index Ave_MEB is an original measure created to catch a block motion. This index finds a TI value in each block and normalizes the TI value with a TI value of a reference video frame to sensitively catch a block motion.

The subjective quality estimating part 24 receives the spatial feature values calculated by the spatial feature value calculating part 22 and the temporal feature values calculated by the temporal feature value calculating part 23 and estimates a subjective assessment value indicative of a subjective quality of the deteriorated video signal PI relative to the reference video signal RI. The subjective assessment value (Y) is calculated as follows:

$$Y = \alpha X_1 + \beta X_2 + \gamma X_3 + \delta \quad (17)$$

where $X_1$=Ave_EE, $X_2$=Min_HV, and $X_3$=Ave_MEB.

This subjective assessment value is a final value to be provided.

The coefficients $\alpha$, $\beta$, $\gamma$, and $\delta$ are weighting factors that are obtained from subjective assessment tests to find relationships between deteriorated video images and subjective assessment values and are used to determine a correspondence between temporal and spatial feature values and a subjective assessment value. The coefficients α, β, γ, and δ are determined according to, for example, a signal format of the deteriorated video signal PI, an information size of deteriorated video images transmitted with the deteriorated video signal PI, and an encoding method of the deteriorated video signal. Accordingly, the coefficients α, β, γ, and δ can be calculated in advance according to a signal format of a given deteriorated video signal PI, an information size of deteriorated video images transmitted with the deteriorated video signal PI, and an encoding method of the deteriorated video signal.

The video quality assessing apparatus according to the second embodiment explained above is capable of invariably estimating a subjective quality of an optional video signal. The degree of an improvement achieved by the video quality assessing apparatus of the second embodiment relative to the conventional video quality assessing apparatus will be explained later in detail with reference to the drawings.

The video quality assessing apparatus shown in FIG. 4 according to the second embodiment may be incorporated in the subjective quality estimating part 11 of the video quality assessing apparatus of FIG. 1. In this case, the video quality assessing apparatus shown in FIG. 4 receives a reference video signal RI and a deteriorated video signal PI, and the subjective quality estimating part 24 outputs a value serving as a primary estimated subjective quality SQ to the correcting part 15. The correcting part 15 receives correction information CI from the correction calculating part 14 and the primary estimated subjective quality SQ and calculates a final estimated subjective quality Q.

Third Embodiment

Figure 6:
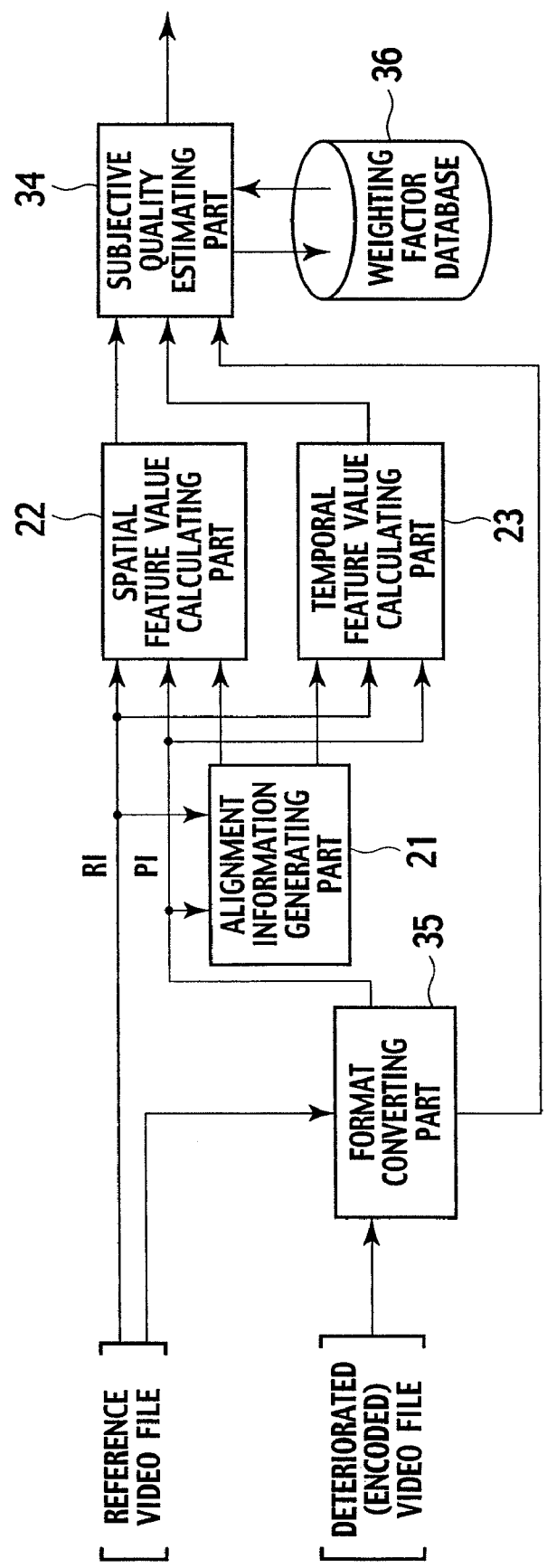
FIG. 6 is a block diagram showing a video quality assessing apparatus according to a third embodiment of the present invention.
Figure 9:
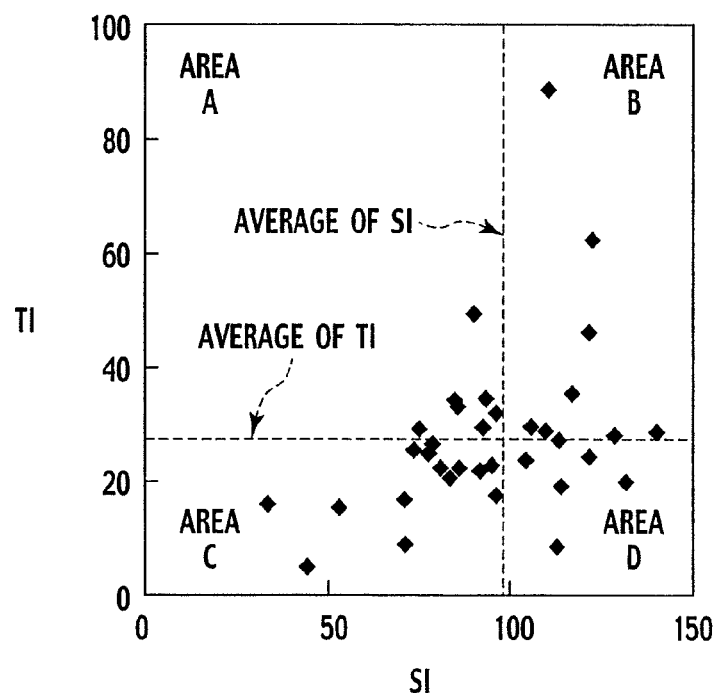
FIG. 9 is a view showing a distribution of SI (spatial information) values and TI (temporal information) values calculated according to the learning data and verification data of FIG. 8.

Components of a video quality assessing apparatus according to the third embodiment of the present invention will be explained with reference to FIG. 6. FIG. 6 is a block diagram showing an arrangement of the video quality assessing apparatus according to the third embodiment of the present invention.

Compared with the video quality assessing apparatus of the second embodiment, the video quality assessing apparatus of the third embodiment differs in that it receives a reference video signal RI and deteriorated video signal PI having different file formats and in that a signal format of the deteriorated video signal PI, an information size of deteriorated video images transmitted with the deteriorated video signal PI, and an encoding system of the deteriorated video signal PI, are unknown. The same parts as those of the video quality assessing apparatus of the second embodiment are represented with like reference marks and their explanations are omitted.

The video quality assessing apparatus of the third embodiment shown in FIG. 6 has a format converting part 35, an alignment information generating part 21, a spatial feature value calculating part 22, a temporal feature value calculating part 23, a subjective quality estimating part 34, and a weighting factor database 36.

The format converting part 35 receives a reference video file and a deteriorated video file, and if the file format of the deteriorated video file differs from that of the reference video file, converts the file format of the deteriorated video file into that of the reference video file. For example, if the signal format, color distribution, size, aspect ratio, and encoding system of the deteriorated video file differ from those of the reference video file, the format converting part 35 converts the file format of the deteriorated video file into that of the reference video file. Thereafter, the format converting part 35 outputs a deteriorated video signal PI from the deteriorated video file whose file format has been converted into that of the reference video file. The deteriorated video signal PI from the format converting part 35 is supplied to the alignment information generating part 21, spatial feature value calculating part 22, and temporal feature value calculating part 23.

If reference video images have a YUV format of VGA size and if deteriorated video images have an RGB color format that is different from the color format of the reference video images, the format converting part 35 converts the format of the deteriorated video images into that of the reference video images according to a conversion formula stipulated in, for example, Rec. ITU-R BT.601, "STUDIO ENCODING PARAMETERS OF DIGITAL TELEVISION FOR STANDARD 4:3 AND WIDE-SCREEN 16:9 ASPECT RATIOS." When equalizing the size and aspect ratio between the reference video images and deteriorated video images, the format converting part 35 may carry out conversion simply through an integer multiplication. If this is insufficient, it is necessary to carry out an optional size conversion. In this case, a known technique will be employed. (For example, Muramatsu S. and Kiya H, "Scale Factor of Resolution Conversion Based on Orthogonal Transforms," IEICE Trans. Fundamentals, E76-A, 7, pp. 1150-1153 (July 1993); and Shogo Matsumura and Hitoshi Takaie, "Resolution conversion method with optional rational number multiplication for changed encoded images," IEICE Trans. A, Vol. 77-A, No. 3, pp. 369-378, March 1994 may be referred to.) A compressed video signal must be decompressed in advance.

Color and brightness distributions of a deteriorated video image are dependent on the video encoding system, the characteristics of a transmission system, and national standards related to the image. These factors may bias a subjective assessment value of the image. To avoid the bias, distributions of, for example, brightness values of reference and deteriorated video images must be normalized. For this, statistical values are extracted from reference and deteriorated video frames. The statistical values may be the maximum, minimum, average, and dispersion values of brightness, chrominance, and RGB of pixels in each frame. To equalize the distribution of, for example, brightness between the reference and deteriorated video frames, the brightness values of all pixels in the deteriorated video frame are shifted by an average brightness deviation. Alternatively, a conversion expression (18) is employed to equalize a minimum-to-maximum range of pixel values between the reference and deteriorated video frames. This results in normalizing the distributions of pixel values of the reference and deteriorated video frames.

$$H = \{(\text{Maximum pixel value} - \text{Minimum pixel value of reference video image})/(\text{Maximum pixel value} - \text{Minimum pixel value of deteriorated video image})\} \times X \quad (18)$$

where Y is a pixel value of the deteriorated video image after conversion and X is a pixel value of the deteriorated video image before conversion.

The format converting part 35 provides the subjective quality estimating part 34 with information related to the file format of the converted deteriorated signal PI, i.e., the file format of the reference video signal RI. The information related to the file format includes, for example, the signal format, color distribution, size, aspect ratio, and encoding system of the deteriorated video file. According to the third embodiment, supplied to the subjective quality estimating part 34 are the signal format, size, and encoding system of the deteriorated video file.

The weighting factor database 36 stores condition sets of the signal format, size, and encoding system of a deteriorated video file. Each condition set is related to weighting factors α, β, γ, and δ. These weighting factors are obtained from relationships between deteriorated video images and subjective assessment values through subjective assessment tests and indicate correspondence between temporal and spatial feature values and the subjective assessment values. FIG. 7 shows the condition sets and the corresponding weighting factors stored in the weighting factor database 36.

The subjective quality estimating part 34 retrieves weighting factors α, β, γ, and δ from the weighting factor database 36 according to the signal format, size, and encoding system of the deteriorated video file provided by the format converting part 35. This operation differs from that of the subjective quality estimating part 24 of the second embodiment. The other operations of the subjective quality estimating part 34 are the same as those of the subjective quality estimating part 24.

In FIG. 6, the format converting part 35 and alignment information generating part 21 are separately arranged. The format converting part 35 and alignment information generating part 21 may be integrated into one and incorporated in the video quality assessing apparatus of FIG. 6.

The third embodiment explained above can estimate a subjective quality of a deteriorated video image even if the file format of a deteriorated video file differs from that of a reference video file. The third embodiment can handle deteriorated video files of various signal formats, sizes, and encoding systems and estimate the subjective qualities of such video files.

The degrees of accuracy of video quality assessments carried out by the video quality assessing apparatuses of the second and third embodiments will be compared with those of the conventional video quality assessing apparatus and will be explained with reference to FIGS. 8 to 16.

First, subjective assessment data used to verify estimation accuracy and find the weighting factors stored in the weighting factor database 36 will be explained. FIG. 8 shows 36 standard video images (having video sequence names as shown in FIG. 8) according to ITU-R (ITU-R BT. 802-1, "Test Pictures and Sequences for Subjective Assessments of Digital Codecs Conveying Signals Produced According to Recommendation ITU-R BT.601," 1994; and ITU-R BT.1201-2, "Test materials to be used in subjective assessment," 2001). In FIG. 8, the standard video images are separated into verification data for verifying the estimation accuracy of a video quality assessment value and learning data for finding the weighting factors.

The subjective assessment data used to verify estimation accuracy is selected in such a way as to minimize the influence of a bias in the characteristics of a reference video image. Namely, the spatial information (SI) and temporal information (TI) stipulated in ITU-T P.910 (ITU-T P. 910, "Subjective video quality assessment methods for multimedia applications," August 1996) are considered, and the same number of video images are selected for each of areas A to D shown in FIG. 9. This allows to use video images having various SI values and TI values as reference video images. The reference video images are deteriorated by carrying out an MPEG4-based encoding in four stages in the range of 256 kbps to 8 Mbps.

As a subjective quality assessing method, a DSCQS method (ITU-R BT.500-10, "Methodology for the subjective assessment of the quality of television pictures," March 2000) is used on 24 male and female general test subjects ranging from 18 to 40-years old. The DSCQS method is frequently used for MPEG verification and codec performance tests.

A target degree of estimation accuracy for the video quality assessing apparatus is preferable to be equal to the degree of variation of subjective assessment points. For one-side 95% confidence interval, the degree of variation of subjective assessment values was 7.24 for all data. Accordingly, a target degree of estimation accuracy for the video quality assessing apparatus is equal to or below this value when the estimation accuracy is calculated as a mean square error (RMSE).

Figure 10:
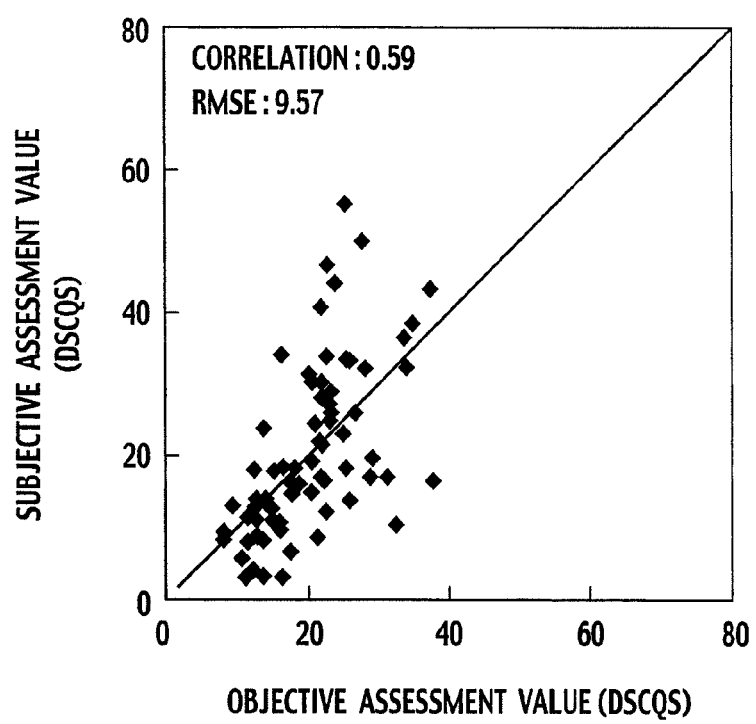
FIG. 10 is a view showing results of estimation of learning data based on conventional peak SN ratios (PSNR)
Figure 11:
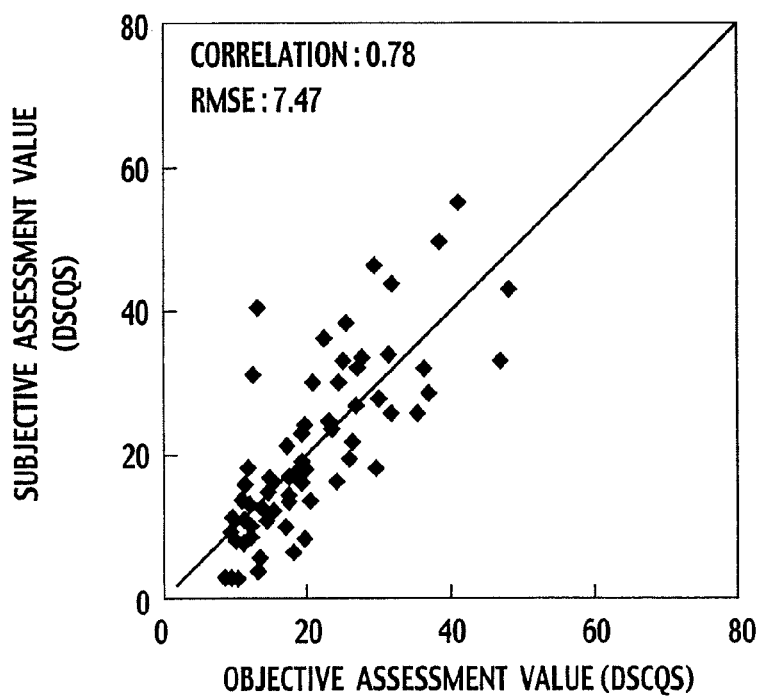
FIG. 11 is a view showing results of estimation of learning data based on conventional edge energy (Ave_EE)

For the conventional video quality assessing apparatus, generally employed PSNR (peak signal noise ratio, or peak SN ratio) and edge energy (Ave-EE) known as an ANSI parameter were used. Estimated results for the learning data are shown in FIGS. 10 and 11. FIG. 10 shows estimated results with PSNR and FIG. 11 shows estimated results with edge energy (Ave_EE). In FIGS. 10 and 11, the PSNR provides an RMSE of 9.57 and the edge energy (Ave_EE) provides an RMSE of 7.47. Compared with the PSNR, the edge energy (Ave_EE) shows better performance. The RMSE exceeds the target value, to demonstrate an insufficient degree of estimation accuracy.

Figure 12:
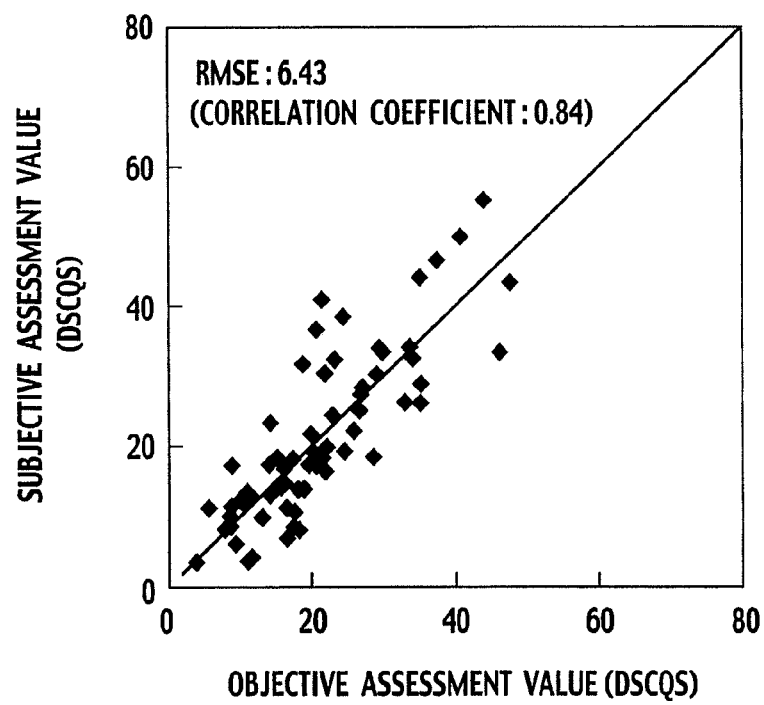
FIG. 12 is a view showing results of estimation of learning data provided by the video quality assessing apparatus of any one of the second and third embodiments of the present invention.
Figure 13:
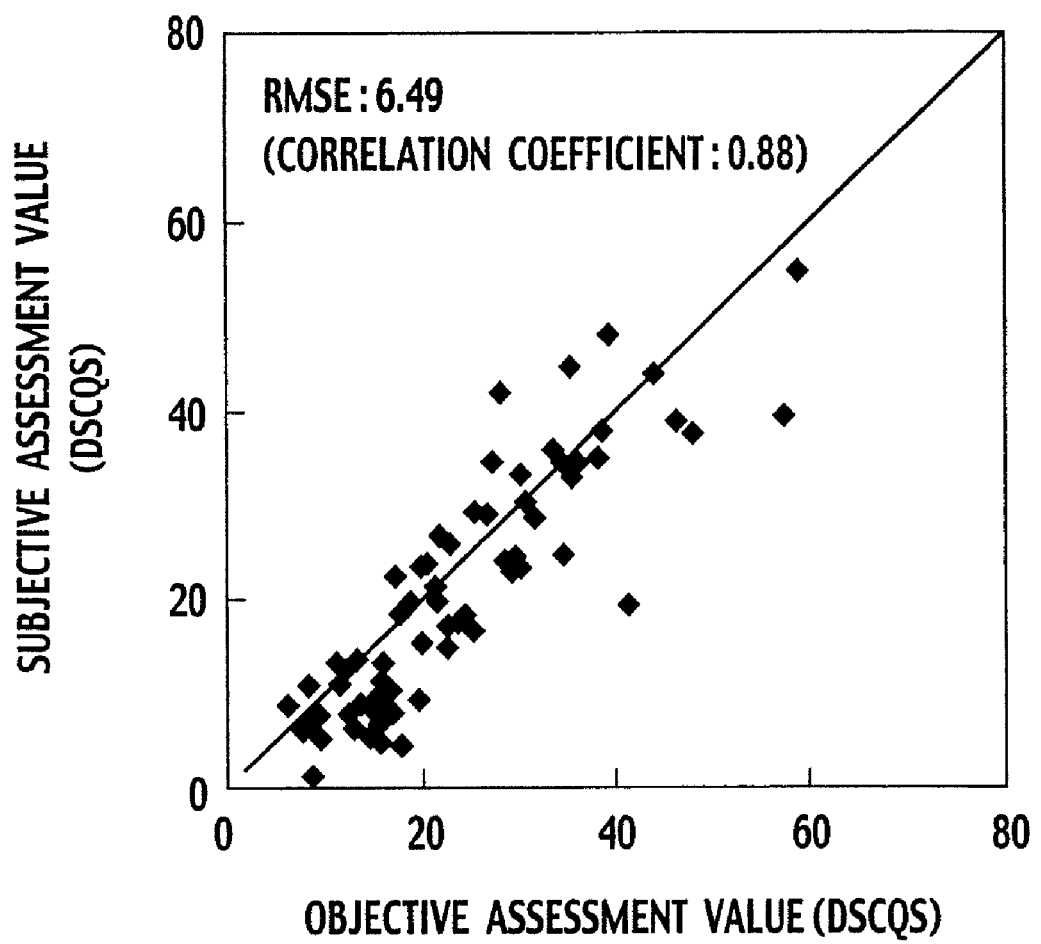
FIG. 13 is a view showing results of estimation of verification data provided by the video quality assessing apparatus of any one of the second and third embodiments of the present invention.

FIGS. 12 and 13 show estimated results for the learning data and verification data with the use of the video quality assessing apparatuses of the second and third embodiments with all of the edge energy (Ave_EE), minimum horizontal/vertical edge quantity (Min_HV), and Ave_MEB. In FIGS. 12 and 13, an RMSE for the learning data is 6.43 and an RMSE for the verification data is 6.49. The target estimation accuracy is sufficiently cleared not only for the learning data but also for the verification data that is non-learning data. It is understood, therefore, that the video quality assessing apparatuses according to the second and third embodiments provide such a degree of estimation accuracy that the apparatuses can substitute for subjective assessment quality tests carried out by human testers who must actually watch and evaluate sample images. Namely, the apparatuses are practically usable.

Figure 14:
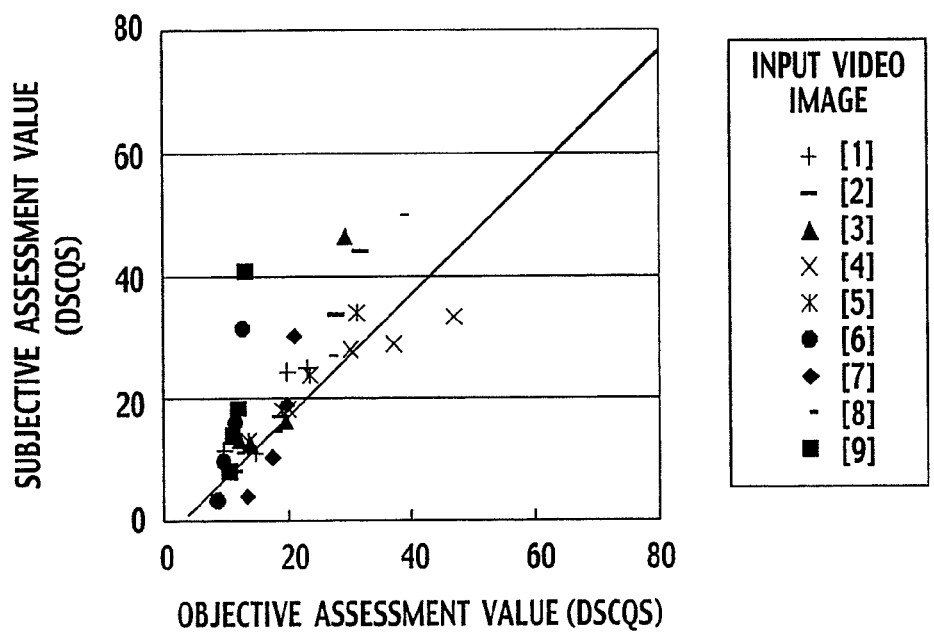
FIG. 14 is a view showing results of estimation of learning data based on only conventional edge energy (Ave_EE)

FIG. 14 shows estimated results of part of the learning data with only the edge energy (Ave_EE). In FIG. 14, input video images [3], [6], [7], and [9] show each a large inclination in evaluation points. Although objective assessment values show substantially no change on these images, subjective assessment values greatly change on the same images. It is understood that the edge energy (Ave_EE) alone is insufficient to catch deteriorations occurring in the video images.

Figure 15:
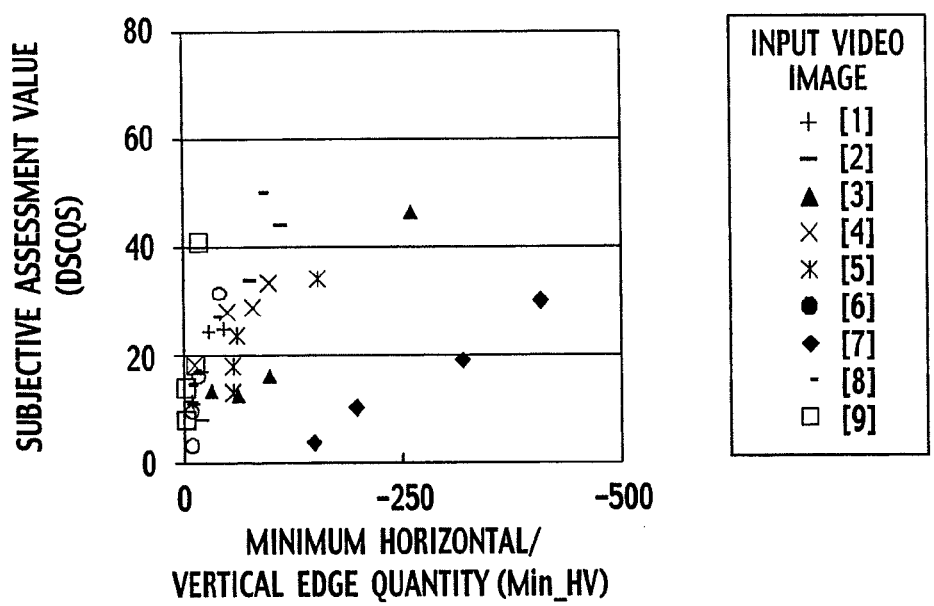
FIG. 15 is a view showing a relationship between a minimum horizontal/vertical edge quantity (Min_HV) and a subjective assessment value.

FIG. 15 is a view showing relationships between minimum horizontal/vertical edge quantities (Min_HV) and subjective assessment values. In FIG. 15, it is understood that the minimum horizontal/vertical edge quantities (Min_HV) can sensitively catch deteriorations in the input video images [3] and [7].

Figure 16:
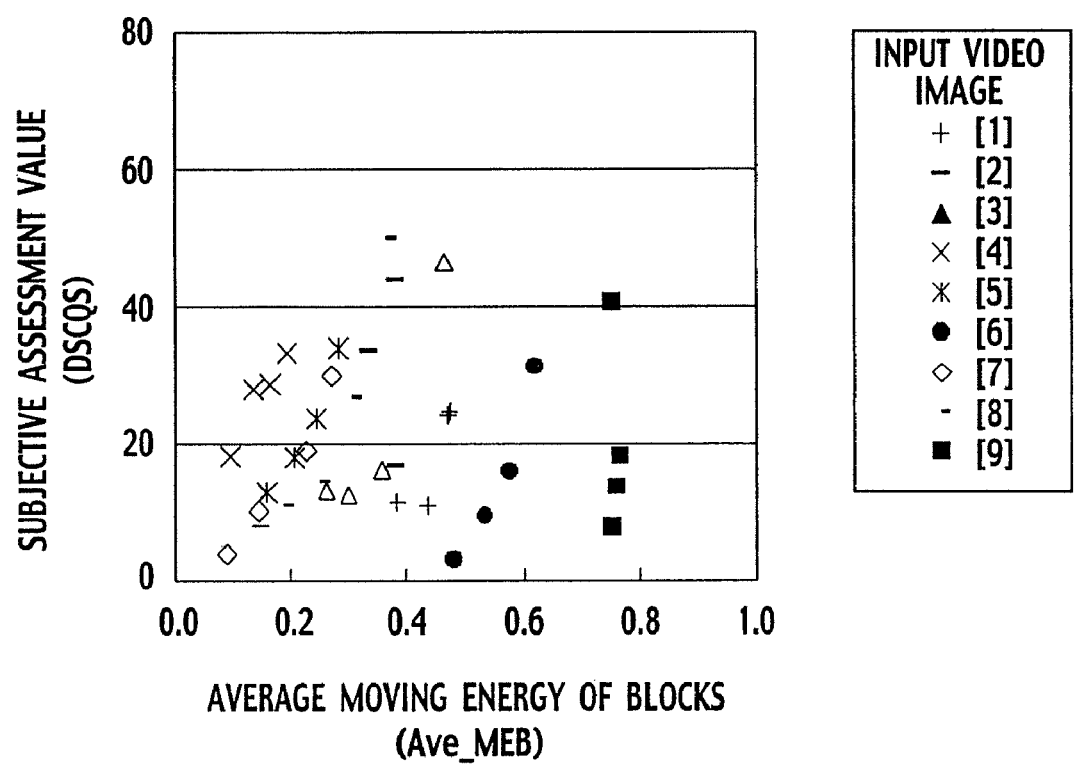
FIG. 16 is a view showing a relationship between average moving energy of blocks (Ave_MEB) and a subjective assessment value.

FIG. 16 is a view showing relationships between average moving energy of blocks (Ave_MEB) and subjective assessment values. As shown in FIG. 16, the average moving energy of blocks (Ave_MEB) can sensitively catch deteriorations in the input video images [6] and [9].

In this way, the second and third embodiments employ, as physical feature values of video images, parameters to catch deteriorations occurring in edge areas, and in addition, two original parameters to supplement accuracy, thereby expanding the application of the subjective quality assessing technique, which has demonstrated assessing accuracy only on specific video images, to optional video images.

Fourth Embodiment

A video aligning apparatus, video aligning method, and video aligning program according to embodiments of the present invention will be explained.

Figure 17:
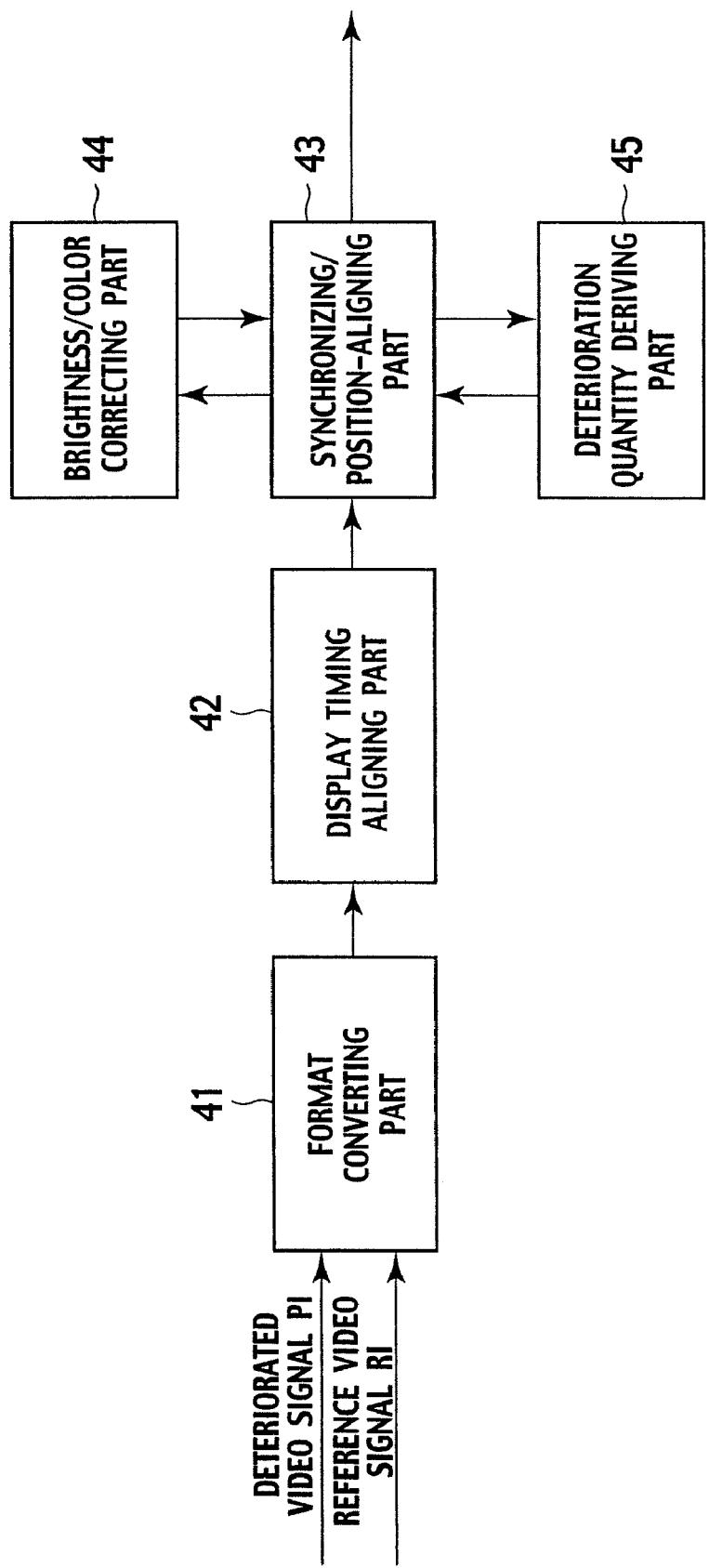
FIG. 17 is a block diagram showing a video aligning apparatus according to an embodiment of the present invention.

FIG. 17 is a block diagram showing a video aligning apparatus according to an embodiment of the present invention.

The video aligning apparatus according to the fourth embodiment at least includes a format converting part 41, a display timing aligning part 42, synchronizing/position-aligning part 43, brightness/color correcting part 44, and a deterioration quantity deriving part 45.

The format converting part 41 converts a file format contained in a deteriorated video signal deteriorated due to encoding or a network loss into a file format of reference images contained in a reference video signal. The display timing aligning part 42 adjusts the video display timing of the reference video signal and deteriorated video signal to each other. The synchronizing/position-aligning part 43 obtains information about deterioration quantity and synchronization shift and aligns the reference video signal and deteriorated video signal with each other in temporal and spatial directions. If required, the brightness/color correcting part 44 corrects differences in brightness and color distributions between the reference video signal and the deteriorated video signal.

According to this embodiment, the reference video signal and deteriorated video signal contain frame rate information or frame display time/import time information. If required, it contains signal format information. With this arrangement, the video aligning apparatus stores target frames and several front and rear frames thereof for reference and deteriorated video images and processes them in non-real-time manner.

Figure 18:
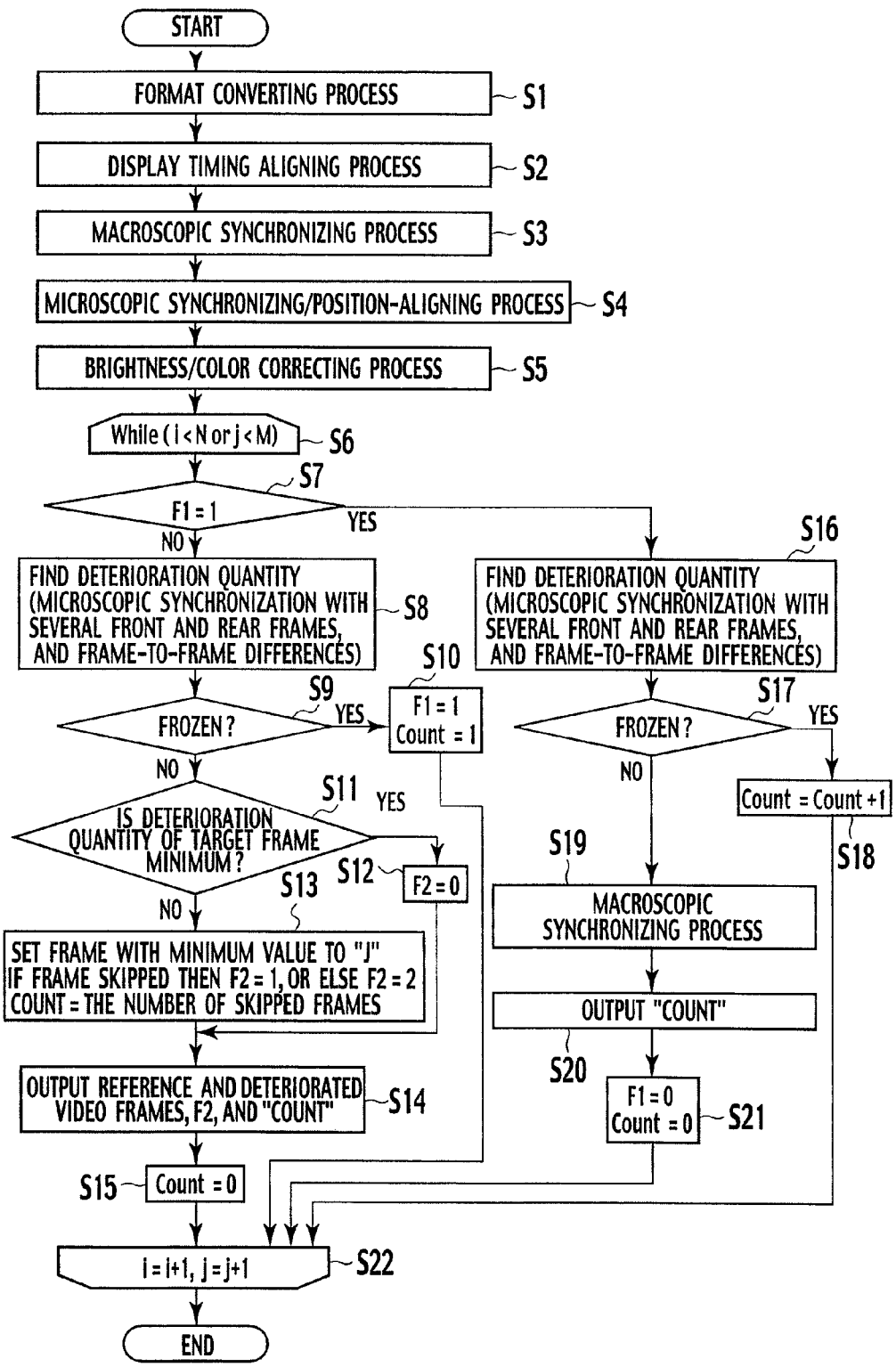
FIG. 18 is a flowchart showing an operational sequence of a video aligning apparatus according to an embodiment of the present invention.

FIG. 18 is a flowchart showing an operation sequence of the video aligning apparatus according to the embodiment.

Firstly, if the signal formats, sizes, and aspect ratios of the reference video signal and deteriorated video signal differ from each other, the format converting part 41 converts the signal format of the deteriorated video signal (step S1). For example, the data format of the reference video signal is YUV, and that of the deteriorated video signal is uncompressed RGB. In this case, the format of the deteriorated video signal is converted with the use of a conversion formula stipulated in Rec. ITU-R BT.601 "STUDIO ENCODING PARAMETERS OF DIGITAL TELEVISION FOR STANDARD 4:3 AND VIDEO-SCREEN 16:9 ASPECT RATIOS." If the deteriorated video signal is compressed, the format converting part 41 decompresses the signal. If the sizes and aspect ratios of the signals differ from each other, the format converting part 41 converts them so that the signals may have the same size and aspect ratio. The sizes thereof may be equalized through a simple integer multiplication. If it is insufficient, the sizes must be optionally changed. In this case, a known method is used to change them into a proper size. (For example, Muramatsu S. and Kiya H, "Scale Factor of Resolution Conversion Based on Orthogonal Transforms," IEICE Trans. Fundamentals, E76-A, 7, pp. 1150-1153 (July 1993); and Shogo Matsumura and Hitoshi Takaie, "Resolution conversion method with optional rational number multiplication for changed encoded images," IEICE Trans. A, Vol. 77-A, No. 3, pp. 369-378, March 1994 may be referred to.) Thereafter, the format converting part 41 transfers the reference video signal and converted deteriorated video signal to the display timing aligning part 42.

The display timing aligning part 42 carries out, for example, a frame interpolation process (step S2) to adjust the display timing of the deteriorated video signal whose format has been converted by the format converting part 41 to that of the reference video signal.

Figure 19:
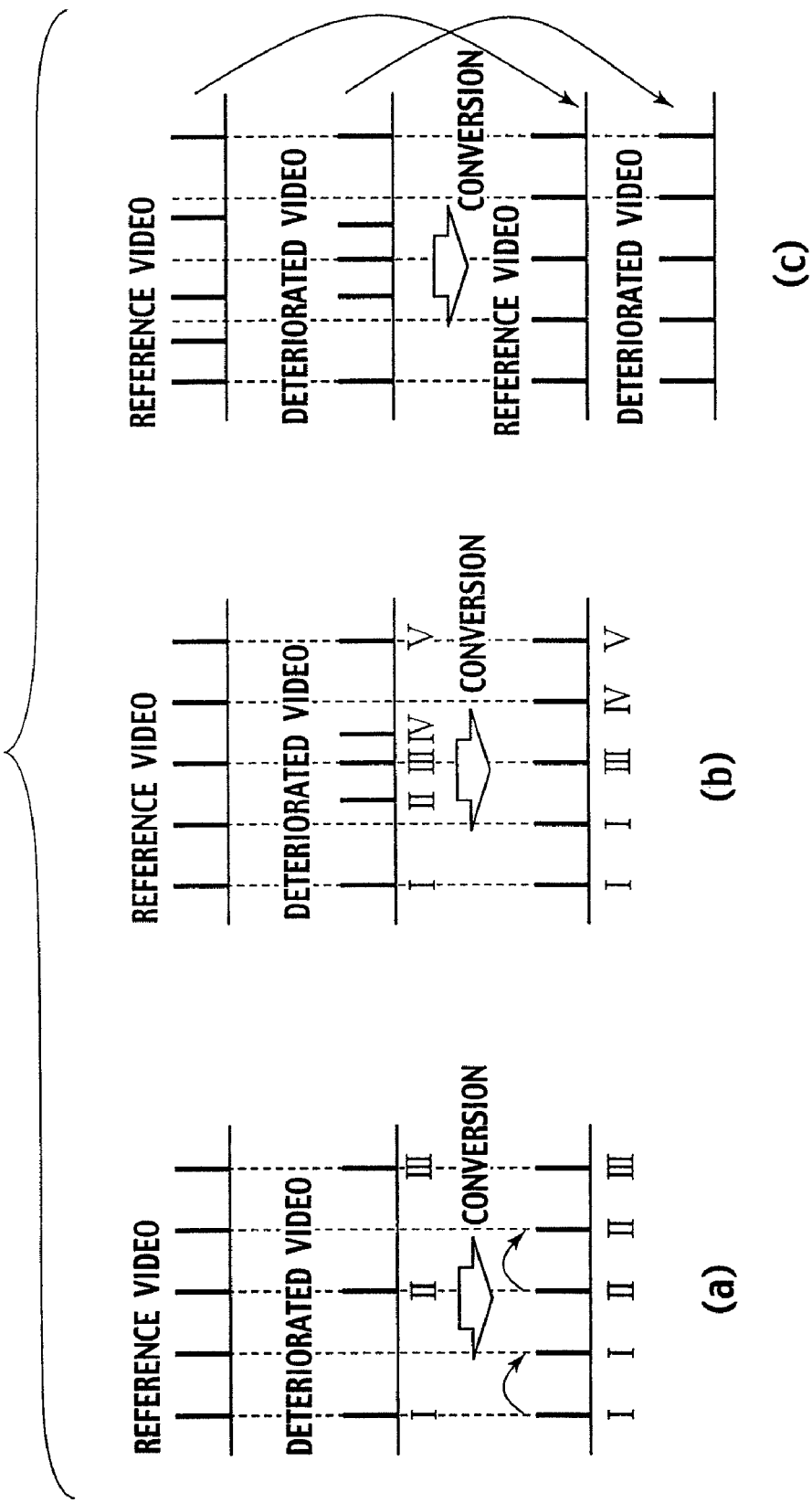
FIG. 19 is a view explaining a process carried out by a display timing aligning part.

More precisely, if the display intervals of the deteriorated video signal are constantly longer than those of the reference video signal as shown in (a) of FIG. 19, the display timing aligning part 42 interpolates all frames as shown in the bottom part of (b) of FIG. 19 to supplement the deteriorated video signal with frames.

If the display intervals of the deteriorated video signal fluctuate as shown in (b) of FIG. 19, the display timing aligning part 42 supplements the deteriorated video signal with a preceding frame in synchronization with the display intervals of the reference video signal. Instead of employing a preceding frame to supplement the deteriorated video signal, a temporally nearest frame may be employed. For example, in the case of (b) of FIG. 19, a frame I is employed as a second frame to supplement the converted deteriorated video signal. Instead, a frame II that is temporally nearest to the second frame position may be employed to supplement the deteriorated video signal.

In (c) of FIG. 19, the reference video signal itself has an irregular frame rate. In this case, the reference video signal and deteriorated video signal are corrected so that they may have regular displaying intervals.

Thereafter, the display timing aligning part 42 transfers the reference video signal and deteriorated video signal to the synchronizing/position-aligning part 43.

The synchronizing/position-aligning part 43 defines its operation for (1) assessment start state, (2) synchronized state, and (3) frozen state.

Figure 20:
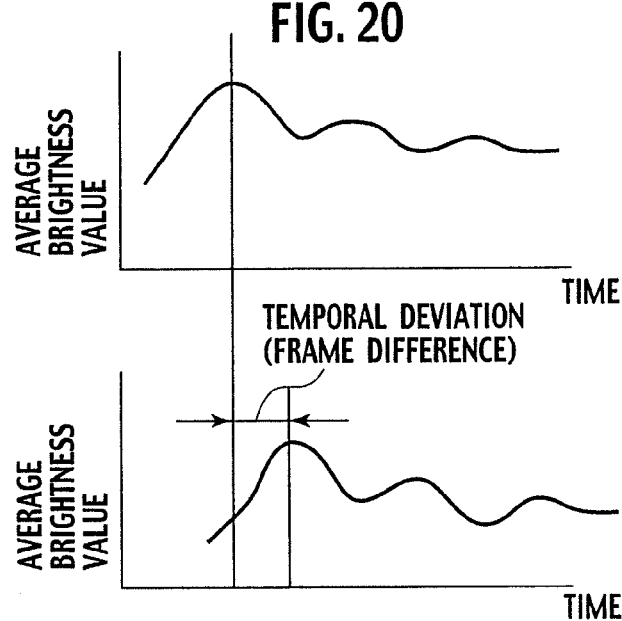
FIG. 20 is a view explaining a macroscopic synchronizing process carried out by a synchronizing/position-aligning part.

(1) In the assessment start state, the synchronizing/position-aligning part 43 carries out a macroscopic synchronizing process. For this, the synchronizing/position-aligning part 43 compares changes in feature values such as averages of brightness, chrominance, or RGB values of frames or a specific area in each frame between the reference video signal and the deteriorated signal for a predetermined time and thus finds a macroscopic temporal deviation between them (step S3). More precisely, as shown in FIG. 20, feature values are shifted in a temporal direction to find conditions that minimize a difference between time-series values of the reference and deteriorated video signals or that maximize a cross-correlation coefficient between the signals.

Figure 21:
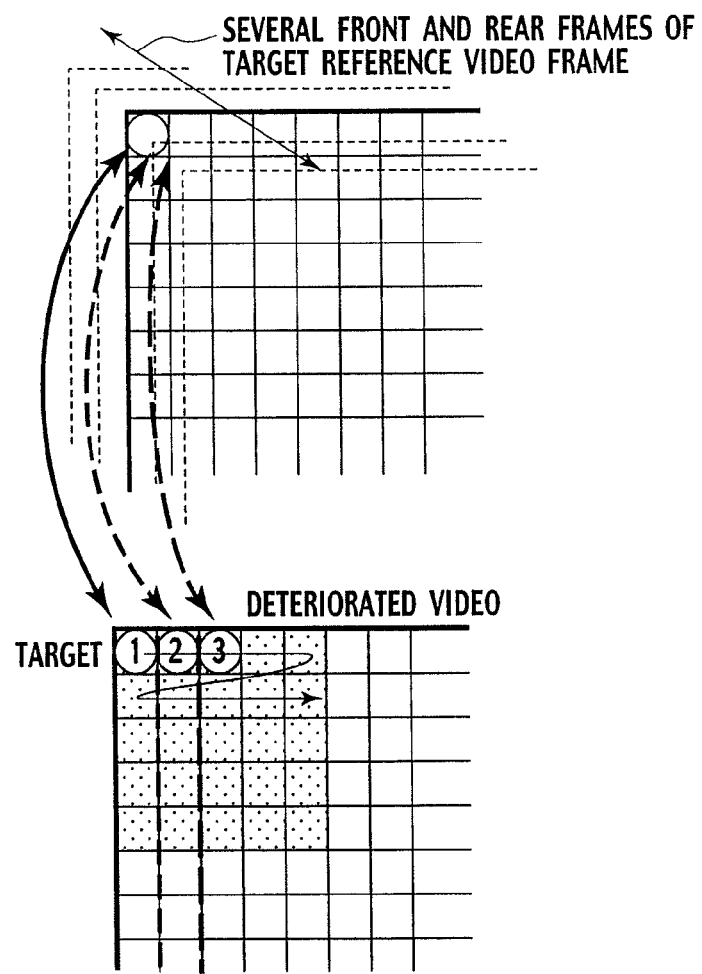
FIG. 21 is a view explaining a microscopic synchronizing/position-aligning process carried out by the synchronizing/position-aligning part.

The synchronizing/position-aligning part 43 carries out a microscopic time-space alignment. To achieve this, a deteriorated video frame is moved in up, down, left, and right directions by pixels relative to an aligned reference video frame and several front and rear frames thereof as shown in FIG. 21, to find a minimum difference position. The minimum difference position is provided as pixel positional information from the deterioration quantity deriving part 45 to the synchronizing/position-aligning part 43 (step S4).

The synchronizing/position-aligning part 43 transfers the aligned reference and deteriorated video frames to the brightness/color correcting part 44 to correct the brightness and color of the frames. The brightness/color correcting part 44 aligns average, minimum, and maximum brightness and color values and their distributions between the reference and deteriorated video frames. For example, if the reference and deteriorated video frames have different brightness distributions, the brightness/color correcting part 44 linearly normalizes the brightness distributions of the reference and deteriorated video frames according to the average and dispersion of the brightness values of the reference and deteriorated video frames. Thereafter, the brightness/color correcting part 44 provides the synchronizing/position-aligning part 43 with correction information including a conversion formula to achieve the linear normalization. The synchronizing/position-aligning part 43 receives the correction information and carries out a brightness/color correcting process according to the received correction information (step S5).

For (2) synchronized state and (3) frozen state, the synchronizing/position-aligning part 43 carries out steps S6 to S22.

If a target reference video frame number i is smaller than a last reference video frame number N, or if a target deteriorated video frame number j is smaller than a last deteriorated video frame number M, steps S7 to S22 are carried out (step S6).

It is determined if F1 is "1" or not, i.e., if the reference video frame and deteriorated video frame are asynchronous or not (step S7). If the reference and deteriorated video frames are synchronous (F1=0), step S8 is carried out. If the reference and deteriorated video frames are asynchronous (F1=1), step S16 is carried out.

The case that the reference and deteriorated video frames are synchronous (F1=0) will be explained.

The synchronizing/position-aligning part 43 provides the deterioration quantity deriving part 45 with the deteriorated video signal with the corrected temporal and spatial deviations and corrected brightness/color information, and the reference video signal, obtained in the assessment start state. The deterioration quantity deriving part 45 carries out the microscopic synchronizing process (FIG. 21) for the target deteriorated video frame with respect to the corresponding reference video frame and several front and rear frames thereof and provides a deterioration quantity. At the same time, differences between current and preceding reference and deteriorated video frames are obtained as deterioration quantities (step S8). The synchronizing/position-aligning part 43 receives these deterioration quantities from the deterioration quantity deriving part 45. According to the frame difference values among the deterioration quantities, the synchronizing/position-aligning part 43 determines whether or not the deteriorated video frames are frozen (step S9). If the difference value of the reference video frames shows a certain value while that of the deteriorated video frames is substantially zero, the synchronizing/position-aligning part 43 determines that the deteriorated video frames are frozen.

If the deteriorated video frames are frozen, the synchronizing/position-aligning part 43 sets an asynchronous state (F1=1) and changes a frozen number to "1" (Count=1) (step S10), and step S22 is carried out.

If the deteriorated video frames are not frozen, the synchronizing/position-aligning part 43 determines whether or not the deterioration quantity of the target deterioration video frame obtained in step S8 by the microscopic synchronizing process of the deterioration quantity deriving part 45 is a minimum or not (step S11). If the deterioration quantity of the target deteriorated video frame is a minimum, a synchronous state is set (F2=0) (step S12), and the control proceeds to step S14. If the deterioration quantity of the target deteriorated video frame is not a minimum, the synchronizing/position-aligning part 43 determines that a frame shift state (a frame skip state, a frame reverse state, or the like) occurred, and the control proceeds to step S13. Step S13 sets a frame number with a minimum deterioration quantity to j and F2=1 if it is a frame skip state, or F2=2 in the other cases (the frame reverse state or the like) and sets the number of skipped or reversed frames to Count value.

Step S14 outputs the reference and deteriorated video frames, F2 value, and Count value. Thereafter, the Count value is reset to zero, and the control proceeds to step S22.

The case of step S7 determining that the reference and deteriorated video frames are asynchronous (F1=1) will be explained.

In step S16, the deterioration quantity deriving part 45 carries out, like in step S8, the microscopic synchronizing process on the target deteriorated video frame and the reference video frames including the frame corresponding to the target deteriorated video frame and front and rear reference video frames, to provide a deterioration quantity. The deterioration quantity is received by the synchronizing/position-aligning part 43. The synchronizing/position-aligning part 43 also receives, as deterioration quantities, differential values between the current and preceding reference and deteriorated video frames. Like step S9, the synchronizing/position-aligning part 43 refers to the frame differential values among the deterioration quantities, to determine whether or not the deteriorated video frames are frozen (step S17).

If the deteriorated video frames are frozen, the synchronizing/position-aligning part 43 increments the frozen number (Count value) (step S18), and the control proceeds to step S22.

If the deteriorated video frames are not frozen, the synchronizing/position-aligning part 43 determines that the frozen state is over and carries out the macroscopic synchronizing process (step S19) like step S3 and outputs the frozen number (Count value) (step S20). Thereafter, the F1 and Count values are each reset to zero, and the control proceeds to step S22.

Step S22 increments the target reference video frame number i and target deteriorated video frame number j. If the i value reaches the last reference video frame number N and the j value reaches the last deteriorated video frame number M, the process ends.

For each of the reference video signal and deteriorated video signal, feature values such as averages of brightness, chrominance, or RGB values of frames or specific areas are kept for a predetermined period. If no synchronization is achieved, for example, if the feature values of a target frame deviate from average values over a predetermined period by a threshold value (for example, a constant multiple of a standard deviation, such as 3σ), the (1) assessment start state is resumed, to restart the process from step S3.

The foregoing descriptions are the details of the video aligning process according to the embodiment of the present invention.

This embodiment carries out the video format conversion and always executes synchronization and alignment based on the macroscopic synchronizing process and microscopic aligning process. With this, the embodiment can properly align reference and deteriorated video frames with each other in temporal and spatial directions even if there are differences in the sizes and aspect ratios of the video frames received at a personal computer terminal, or even if the video frames are spatially deviated from each other due to an information loss such as a loss of packets, or even if there are shifts, variations, and freeze in video display timing due to variations in IP packet arrival intervals and the occurrence of packet losses. Most of these problems have been unexpected in the conventional technology.

The video aligning method of the present invention presumes that the synchronizing/position-aligning part 43 provides the video quality assessing apparatus (for example, the subjective quality estimating part 11 of the video quality assessing apparatus of the first embodiment) with a reference video signal, deteriorated video signal, and additional information (temporal state). The deterioration quantity deriving part 45 may provide a subjective assessment value instead of a deterioration quantity, and the synchronizing/position-aligning part 43 may provide the subjective assessment value, to serve as a video quality assessing apparatus.

In each of the above-mentioned embodiments, the instructions mentioned in the processing sequence may be realized with software, i.e., a program. The program may be beforehand stored in a general purpose computer system, which may read the program and function as the video quality assessing apparatus and video aligning apparatus. The instructions described in each of the embodiments may be stored as a computer executable program in a recording medium such as a magnetic disk (flexible disk, hard disk, or the like), an optical disk (CD-ROM, CD-R, CD-RW, DVD-ROM, DVD+R, DVD+RW, or the like), or a semiconductor memory. A computer may read the program from the recording medium, and a CPU of the computer may execute the instructions in the program so that the computer may operate as the video quality assessing apparatus and video aligning apparatus of any one of the embodiments.

The present invention is not limited to these embodiments. The present invention is achievable in various ways without departing from the spirit thereof. The components disclosed in the embodiments may be properly combined to realize various embodiments of the present invention. For example, some of the components of the embodiments may be deleted, or the components of different embodiments may be properly combined.

INDUSTRIAL APPLICABILITY

The video quality assessing apparatus, video quality assessing method, and video quality assessing program according to the present invention can invariably accurately estimate a subjective quality of optional video frames including unknown reference video frames.

In more detail, the video quality assessing apparatus, video quality assessing method, and video quality assessing program of the present invention find human sensing visual characteristics from physical feature values of reference video images, prepare a database of correction information for reference video feature values, estimate a subjective quality according to a difference between the physical feature values of reference and deteriorated video images, weight the estimated subjective quality according to the correction information, and invariably provide an accurate subjective quality of the deteriorated video image. The accuracy of the subjective quality provided by the present invention is comparable to that of the conventional subjective assessing method.

The physical video feature values according to the present invention include, in addition to parameters to catch deteriorations occurring around edge regions, the two original parameters for improving accuracy, thereby expanding the application of the subjective quality assessing technique, which has demonstrated assessing accuracy only on specific video images, to optional video images.

The video aligning apparatus, video aligning method, and video aligning program of the present invention compare the physical feature values of reference and deteriorated video signals with each other and surely align the spatial and temporal positions of the signals when estimating a subjective quality of the deteriorated video signal.

In more detail, the video aligning apparatus, video aligning method, and video aligning program of the present invention carry out the video format conversion and always execute synchronization and alignment based on the macroscopic synchronizing process and microscopic aligning process, to properly align reference and deteriorated video frames with each other in temporal and spatial directions even if there are differences in the sizes and aspect ratios of the video frames received at a personal computer terminal, or even if the video frames are spatially deviated from each other due to an information loss such as a loss of packets, or even if there are shifts, variations, and freeze in video display timing due to variations in IP packet arrival intervals and the occurrence of packet losses. Most of these problems have been unexpected in the conventional technology.

The video aligning apparatus and method mentioned above may be used to provide a video quality assessing apparatus and method capable of conducting an objective assessment of video quality and improving the accuracy thereof even under the above-mentioned troublesome situations.

The invention claimed is:

1. A video aligning apparatus comprising:
a format converting part to receive an undeteriorated reference video signal and a deteriorated video signal produced from the reference video signal and convert a file format of deteriorated video images contained in the deteriorated video signal into a file format of reference video images contained in the reference video signal;
a display timing aligning part to equalize the number and display timing of video frames between the reference and deteriorated video signals;
a synchronizing/position-aligning part to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences to carry out a time-space alignment of the reference and deteriorated video frames; and
a brightness/color correcting part to receive the reference video signal and deteriorated video signal from the synchronizing/position-aligning part, adjust brightness and color information of the deteriorated video signal to that of the reference video signal, and return the brightness and color information adjusted deteriorated video signal to the synchronizing/position aligning part.

2. The video aligning apparatus as set forth in claim 1, wherein:
the format converting part converts at least one of the data format, size, and aspect ratio of the deteriorated video signal into those of the reference video signal.

3. The video aligning apparatus as set forth in claim 1, wherein:
if the reference and deteriorated video frames have different frame rates, the display timing aligning part interpolates or reduces the deteriorated video frames to equalize the frame rates of the reference and deteriorated video frames with each other.

4. The video aligning apparatus as set forth in claim 1, wherein:
the display timing aligning part adjusts the display timing of the deteriorated video frames to that of the reference video frames.

5. The video aligning apparatus as set forth in claim 1, wherein:
if the display timing of the reference video frames is irregular, the display timing aligning part adjusts the display timing of the reference and deteriorated video frames to a predetermined time interval.

6. The video aligning apparatus as set forth in claim 1, wherein:

the synchronizing/position-aligning part carries out a macroscopic synchronizing process on the target frames and several front and rear frames thereof of the reference and deteriorated video signals, to compare changes in feature values of the frames or of specific areas in the frames with one another and determine a temporal correspondence that minimizes a feature value difference between the reference and deteriorated video frames.

7. The video aligning apparatus as set forth in claim 6, wherein:
the synchronizing/position-aligning part carries out a microscopic synchronizing/position-aligning process on the target frames and several front and rear frames thereof of the reference and deteriorated video signals, to shift temporal and pixel correspondences between the target and deteriorated video frames, compare feature values of the frames or of specific areas in the frames with one another, and determine temporal and pixel correspondences that minimize a feature value difference between the reference and deteriorated video frames.

8. The video aligning apparatus as set forth in claim 7, wherein:
the synchronizing/position-aligning part initially carries out the macroscopic synchronizing process and microscopic synchronizing/position-aligning process.

9. The video aligning apparatus as set forth in claim 8, wherein:
if the deteriorated video frames are in a frozen state, the synchronizing/position-aligning part counts the number of the frames to measure a duration of the frozen state.

10. The video aligning apparatus as set forth in claim 9, wherein:
the synchronizing/position-aligning part finds feature values of the target frames and several front and rear frames thereof of the reference and deteriorated video signals, and if the feature values of the reference video frames temporally change while the feature values of the deteriorated video frames are temporally unchanged, determines that the deteriorated video frames are in a frozen state.

11. The video aligning apparatus as set forth in claim 8, wherein:
if the deteriorated video frames are in a frozen state or if they are hardly synchronized with the reference video frames, the synchronizing/position-aligning part again carries out the macroscopic synchronizing process.

12. The video aligning apparatus as set forth in claim 8, wherein:
if the deteriorated video frames are in a frame misaligned state, the synchronizing/position-aligning part outputs the number of misaligned frames.

13. A video aligning method comprising:
receiving an undeteriorated reference video signal and a deteriorated video signal produced from the reference video signal;
converting a file format of deteriorated video images contained in the deteriorated video signal into a file format of reference video images contained in the reference video signal;
equalizing the number and display timing of video frames between the reference and deteriorated video signals;
monitoring, by a synchronizing/position aligning process, target frames of the reference and deteriorated video signals and several front and rear frames thereof for a misalignment between the reference and deteriorated video frames and a frozen state of the deteriorated video frames and adjusting frame-to-frame and pixel-to-pixel correspondences to carry out a time-space alignment of the reference and deteriorated video frames; and adjusting brightness and color information of the deteriorated video signal to that of the reference video signal and returning the brightness and color-information adjusted deteriorated video signal to the synchronizing/position aligning process.

14. A non-transitory computer readable recording medium having computer-executable instructions, which when executed by a computer cause the computer to function as:
a format converting means to receive an undeteriorated reference video signal and a deteriorated video signal produced from the reference video signal and convert a file format of deteriorated video images contained in the deteriorated video signal into a file format of reference video images contained in the reference video signal;
a display timing aligning means to equalize the number and display timing of video frames between the reference and deteriorated video signals;
synchronizing/position-aligning means to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences to carry out a time-space alignment of the reference and deteriorated video frames; and
a brightness/color correcting means to receive the reference video signal and deteriorated video signal from the synchronizing/position-aligning means, adjust brightness and color information of the deteriorated video signal to that of the reference video signal, and return the brightness-and-color-information-adjusted deteriorated video signal to the synchronizing/position-aligning means.

15. A video quality assessing apparatus comprising:
a format converting part to receive an undeteriorated reference video signal and a deteriorated video signal produced from the reference video signal and convert a file format of deteriorated video images contained in the deteriorated video signal into a file format of reference video images contained in the reference video signal;
a display timing aligning part to equalize the number and display timing of video frames between the reference and deteriorated video signals;
a synchronizing/position-aligning part to monitor target frames of the reference and deteriorated video signals and several front and rear frames thereof for a misalignment between the reference and deteriorated video frames and a frozen state of the deteriorated video frames and adjust frame-to-frame and pixel-to-pixel correspondences to carry out a time-space alignment of the reference and deteriorated video frames;
a brightness/color correcting part to receive the reference video signal and deteriorated video signal from the synchronizing/position-aligning means, adjust brightness and color information of the deteriorated video signal to that of the reference video signal, and return the brightness-and-color-information-adjusted deteriorated video signal to the synchronizing/position-aligning means; and
a subjective quality estimating part to receive the reference video signal and deteriorated video signal aligned by the synchronizing/position-aligning part, calculate video signal feature values for both the signals, and according to a difference between the calculated video signal feature values of the signals, estimate a subjective quality of the deteriorated video signal.

* * * * *